United States Patent [19]

Alyea et al.

[11] Patent Number: 5,047,379

[45] Date of Patent: Sep. 10, 1991

[54] COCONDENSATION OF METAL OXIDES IN ORGANIC SOLVENTS FOR DEPOSITION ON SOLID SUPPORTS

[76] Inventors: Elmer C. Alyea, 115 Cork Street West, Guelph, Ontario, Canada, N1H 2X6; Kevin F. Brown, 52 Shadybrook Crescent, Guelph, Ontario, Canada, N1G 3G5; Keith J. Fisher, 21 Lychgate Avenue, Stourbridge, West Midlands DY9 OTS, England

[21] Appl. No.: 387,705

[22] Filed: Oct. 26, 1989

Related U.S. Application Data

[63] Continuation-in-part of Ser. No. 217,010, Jul. 8, 1988, abandoned.

[51] Int. Cl.$^5$ ............... B01J 21/04; B01J 23/22; B01J 23/28; B01J 29/08
[52] U.S. Cl. ............... 502/79; 502/60; 502/303; 502/305; 502/312; 502/319; 502/321; 502/322; 502/325; 502/338; 502/340; 502/349; 502/353; 502/354

[58] Field of Search ............... 502/60, 79, 321, 322, 502/303, 305, 312, 319, 325, 338, 340, 349, 353, 354

[56] References Cited

U.S. PATENT DOCUMENTS

| | | | |
|---|---|---|---|
| 2,162,276 | 6/1939 | Weiss | 502/321 |
| 2,753,310 | 7/1956 | Riedl | 502/321 X |
| 2,794,005 | 5/1957 | Lefrancois | 502/322 |
| 4,753,916 | 6/1988 | Carcia et al. | 502/321 |

*Primary Examiner*—W. J. Shine

[57] ABSTRACT

Metal oxide catalysts having one or more metal oxides covalently or non-covalently bound to or entrapped on a solid phase support wherein the metal oxide catalyst is prepared by evaporation and cocondensation in a suitable organic solvent are disclosed. Metal oxide catalysts are prepared by evaporation and cocondensation in a suitable organic solvent and dispersed on a solid support as a highly dispersed thin surface film. A process for the preparation of metal oxide catalysts prepared by evaporation and cocondensation is also disclosed. A process for the preparation of metal oxide catalysts prepared by evaporation and cocondensation of metal oxides in a suitable organic solvent and dispersed on a solid support as a high dispersed thin surface film is also disclosed.

29 Claims, 32 Drawing Sheets

GAS CHROMATOGRAPH SPECTRA OF METHANOL TO FORMALDEHYDE CONVERSIONS

CATALYST A
FURNACE TEMPERATURE: 230°C
COMBINED TRAPS

CATALYST A
FURNACE TEMPERATURE: 250°C
COMBINED TRAPS

CATALYST A
FURNACE TEMPERATURE: 270°C
COMBINED TRAPS

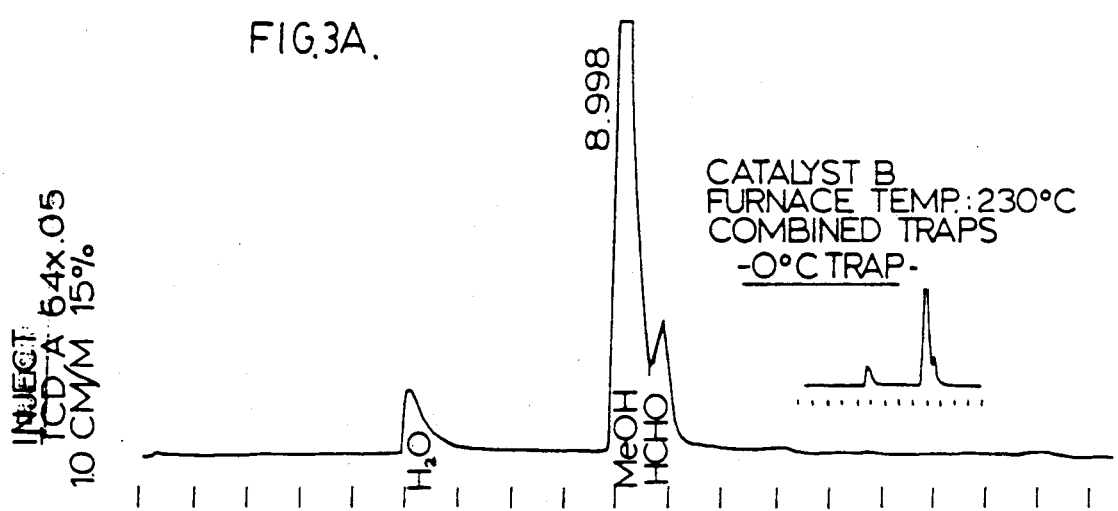
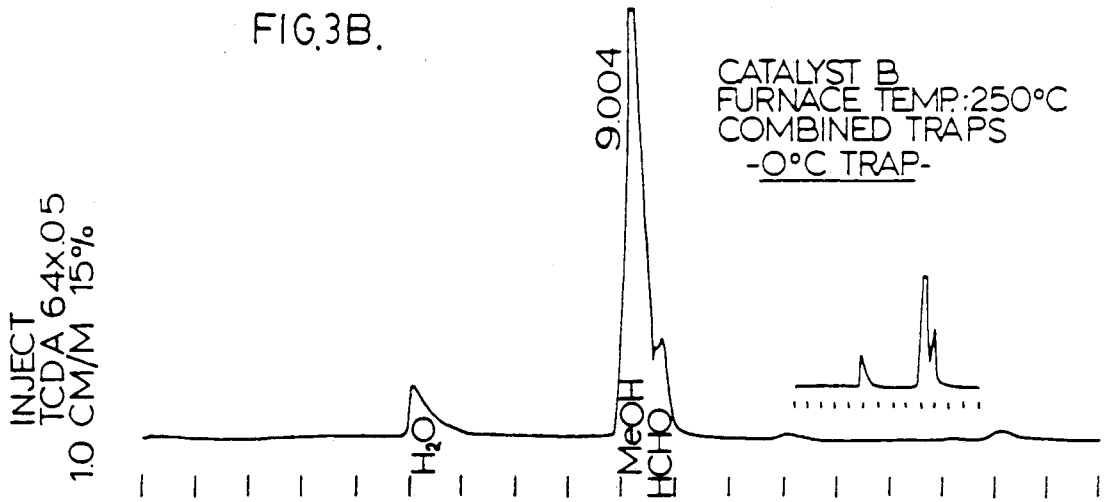
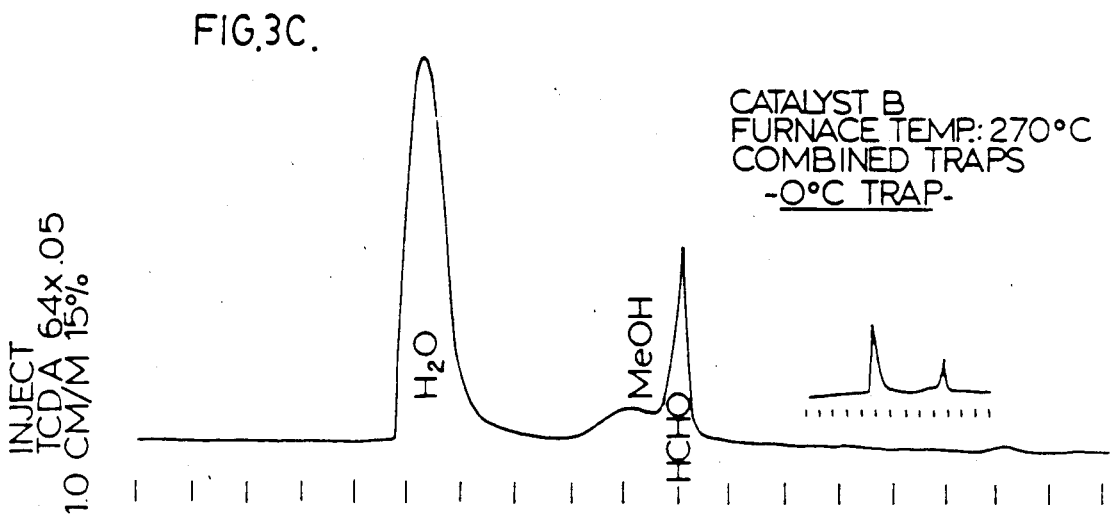

CATALYST D
FURNACE TEMPERATURE: 230°C
COMBINED TRAPS
-0°C TRAP-

CATALYST D
FURNACE TEMPERATURE: 250°C
COMBINED TRAPS
-0°C TRAP-

CATALYST D
FURNACE TEMPERATURE: 270°C
COMBINED TRAPS
-0°C TRAP-

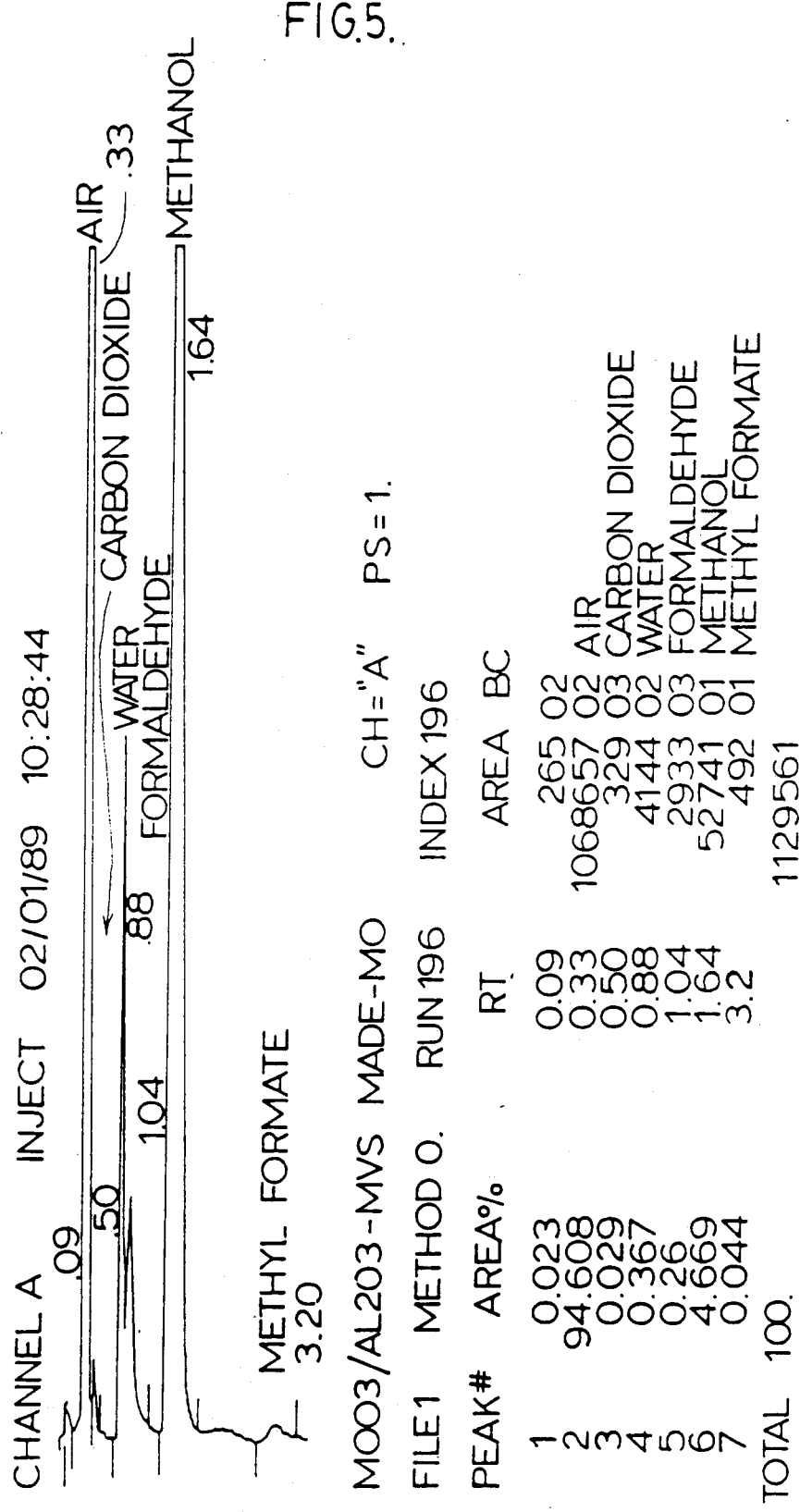
6.5% MoO3 L ALUMINA-MADE BY MVS
MOLYBDENUM METAL DEPOSITION
FOLLOWED BY OXIDATION TO MoO3

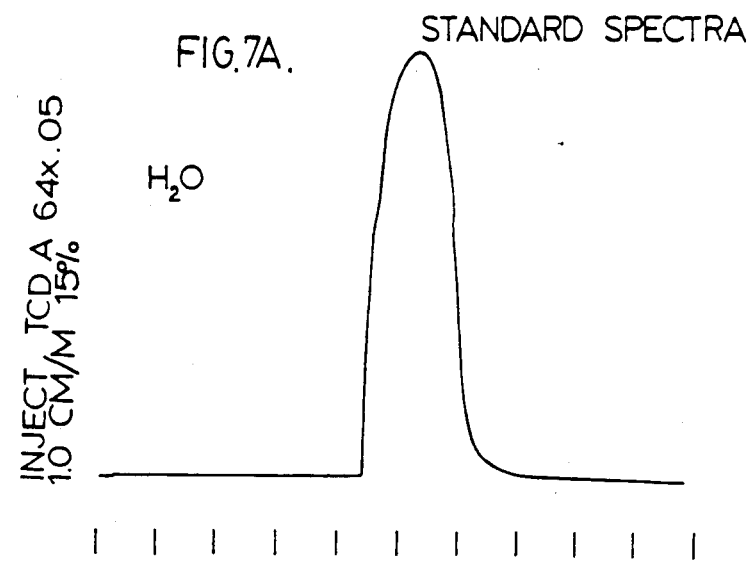
FIG.7A. STANDARD SPECTRA
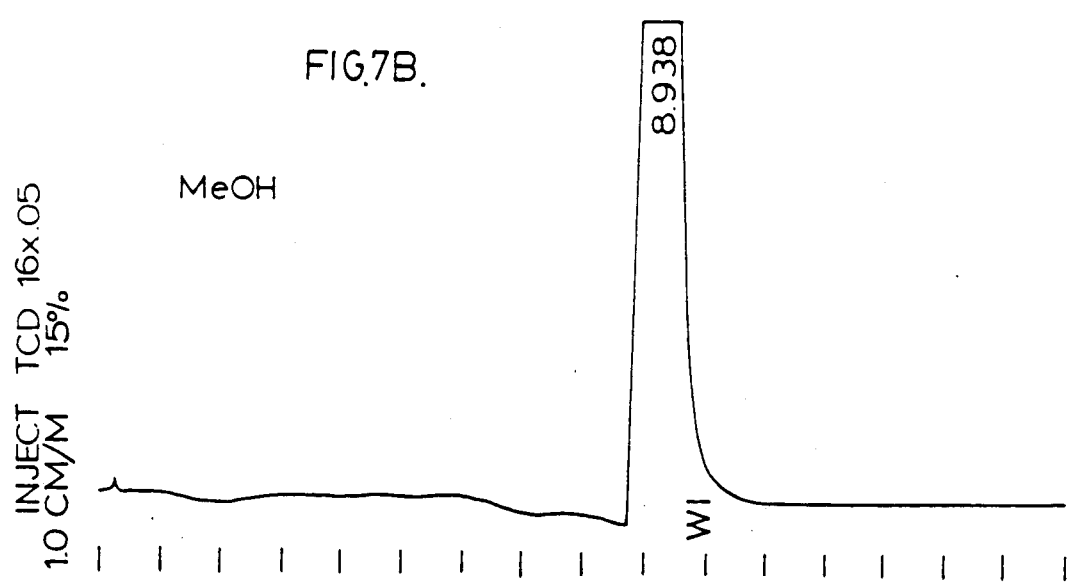
FIG.7B.
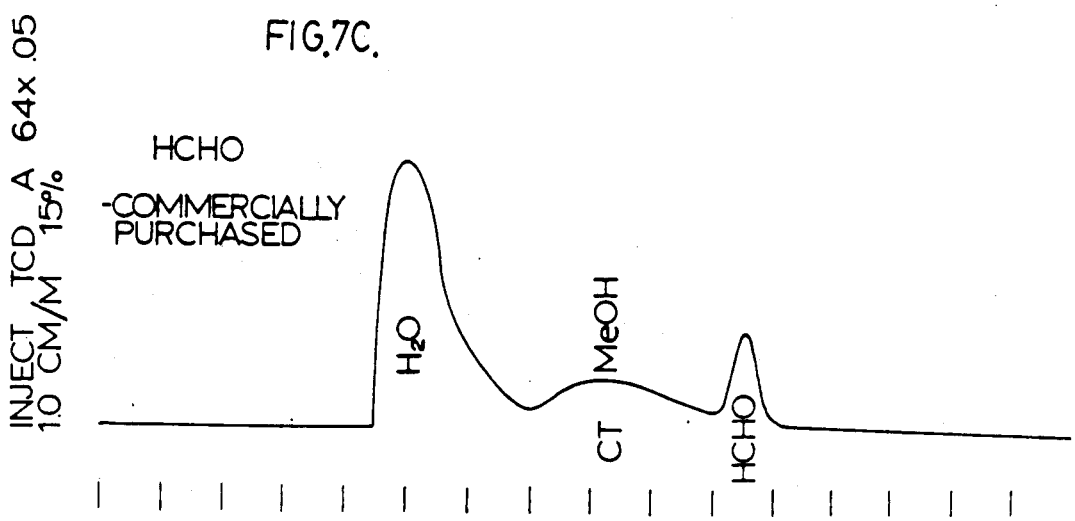
FIG.7C.

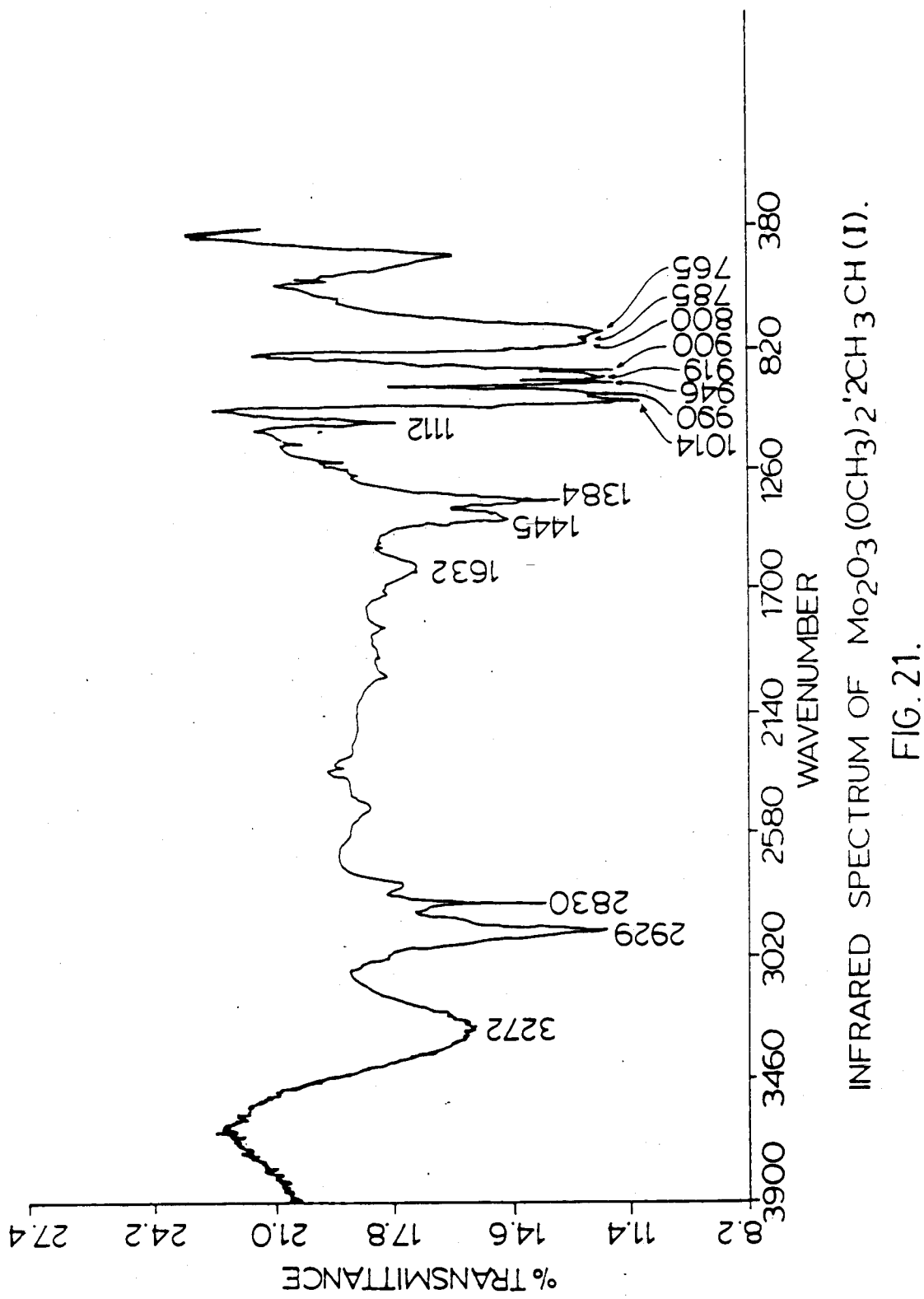

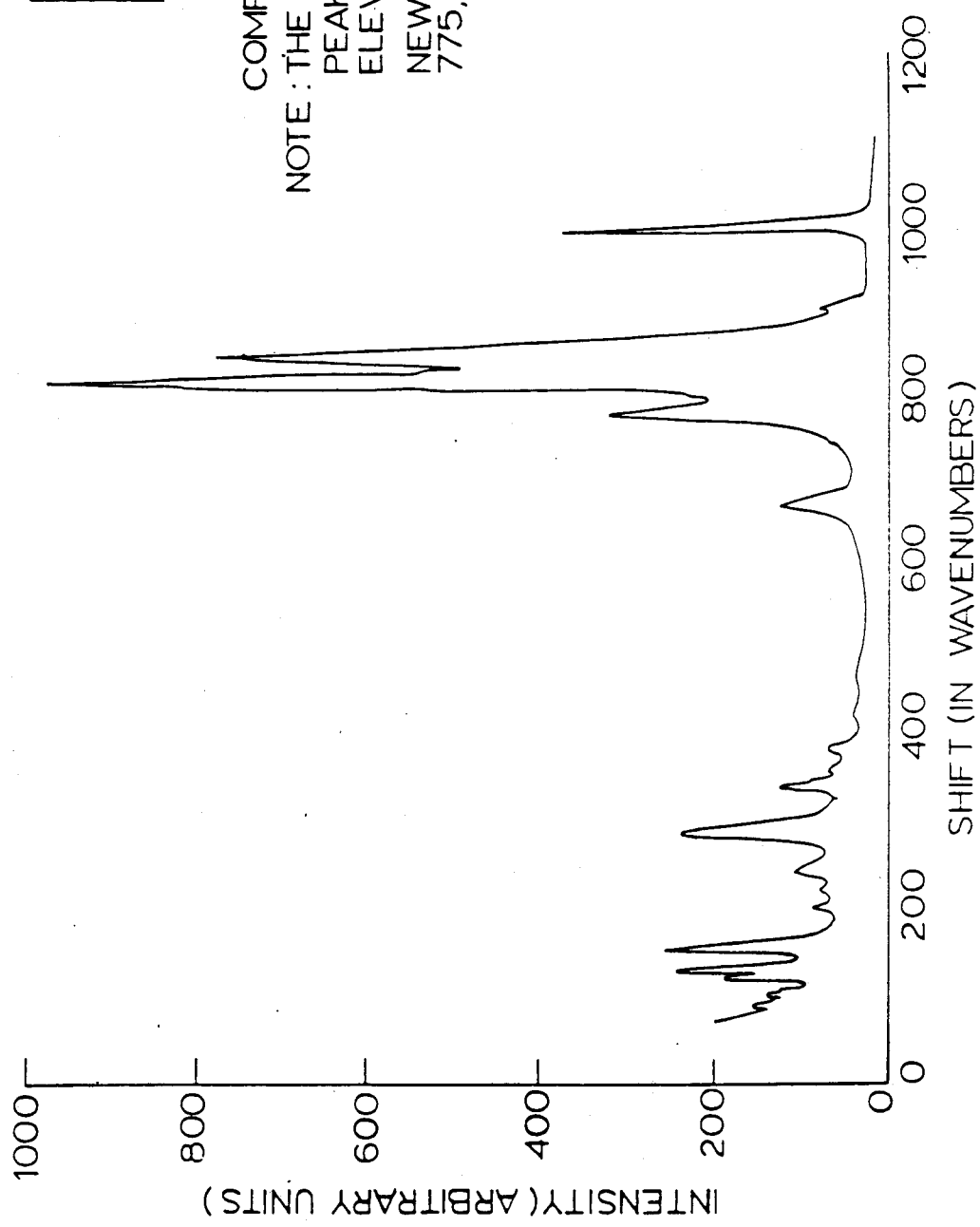
FIG. 22. RAMAN SPECTRUM OF MVS PRECIPITATE – $Mo_2O_5(OCH_3)_2 \cdot 2CH_3OH$
COMPARED TO $MoO_3$,
NOTE: THE WIDTH OF THE PEAKS AND THE ELEVATED BASELINE
NEW PEAKS AT 775, 850 AND 902 $cm^{-1}$

FIG. 23A.

Powder X-Ray Diffraction Patterns
d Spacings (Å)

| $MoO_3$[1] | $MoO_5(OCH_3)_2$ | $Mo_2O_5(OCH_3)_2 \cdot 2CH_3OH$ | $MoO_3CH_3OH$ |
|---|---|---|---|
| 6.93 | 7.31 (100)[2] | 7.88 (100)[2] | 7.86 (S)[3] |
| 3.81 | 4.73 (60) | 5.78 (48) | 5.54 (M) |
| 3.463 | 3.84 (40) | 4.82 (20) | 4.65 (M) |
| 3.260 | 3.76 (25) | 4.69 (37) | 4.19 (M) |
| 3.006 | 3.22 (40) | 4.23 (25) | 3.54 (M) |
| 2.702 | 3.17 (20) | 3.58 (31) | 3.44 (M) |
| 2.655 | 3.10 (40) | 3.48 (21) | 3.06 (M) |
| 2.607 | 2.86 (20) | 3.09 (24) | |
| 2.527 | | 3.06 (56) | |
| 2.332 | | | |
| 2.309 | | | |
| 2.271 | | | |
| 2.131 | | | |
| 1.996 | | | |

1. Commercial preparation of molybdenum trioxide.
2. Relative intensities indicated in brackets as a percent.
3. Relative intensities indicated in brackets as Strong, "S", or Medium, "M".

FIG. 23B.

Powder X-Ray Diffraction Patterns
d Spacings (Å)

| MVS Catalyst Precipitated Photoactivated | MVS Precipitate | MVS Catalyst Precipitated on alumina and Photoactivated |
|---|---|---|
| 10.4030 | 10.403 | 10.526 |
| 7.9711 | 7.9711 | 8.506 |
| 6.836 | 6.3258 | 7.138 |
| 3.784 | 3.2434 | 3.507 |
| 3.444 | | 2.731 |
| 3.246 | | 2.260 |
| 3.000 | | |
| 2.643 | | |
| 2.650 | | |
| 2.515 | | |
| 2.296 | | |
| 2.270 | | |

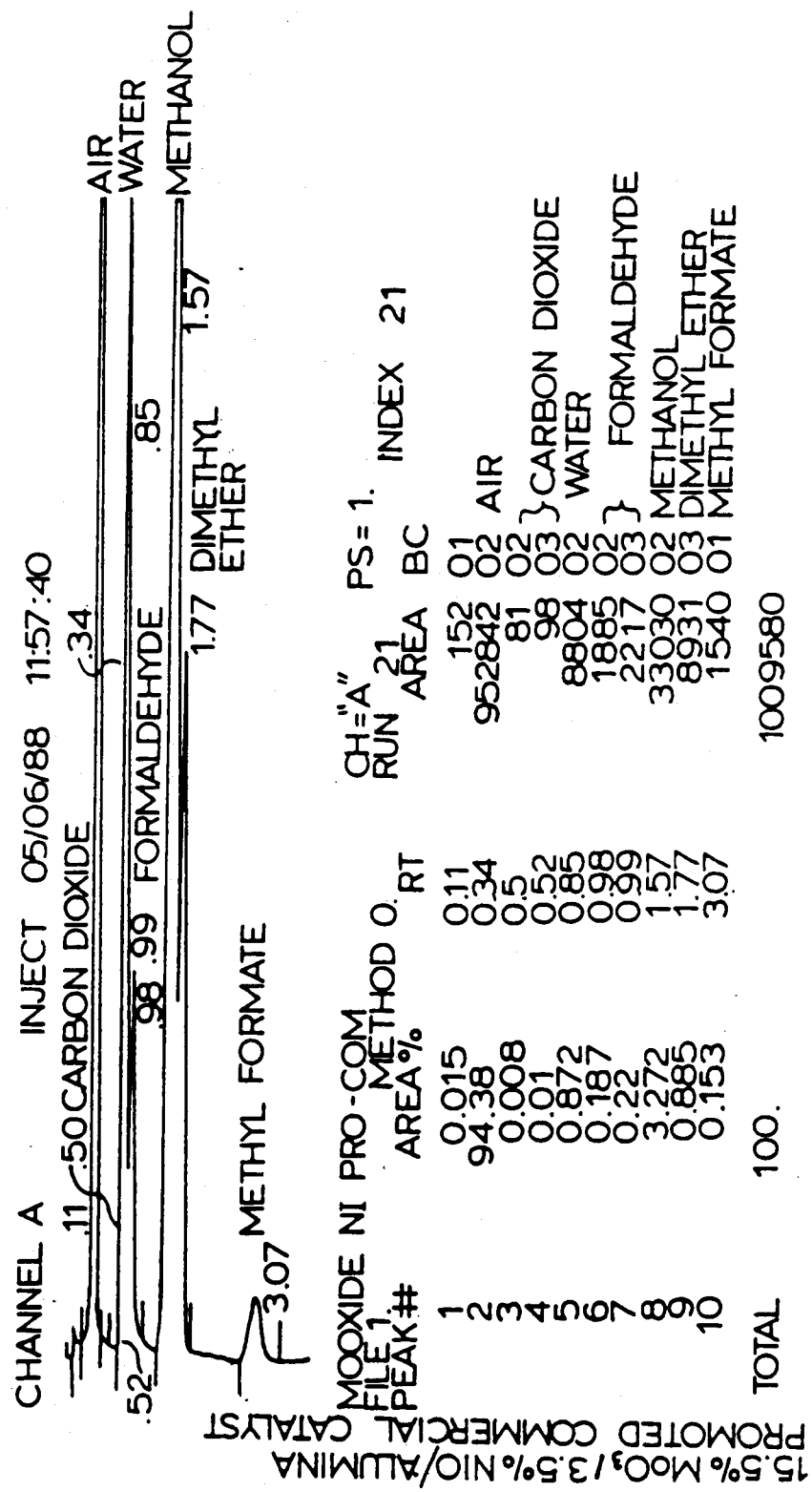

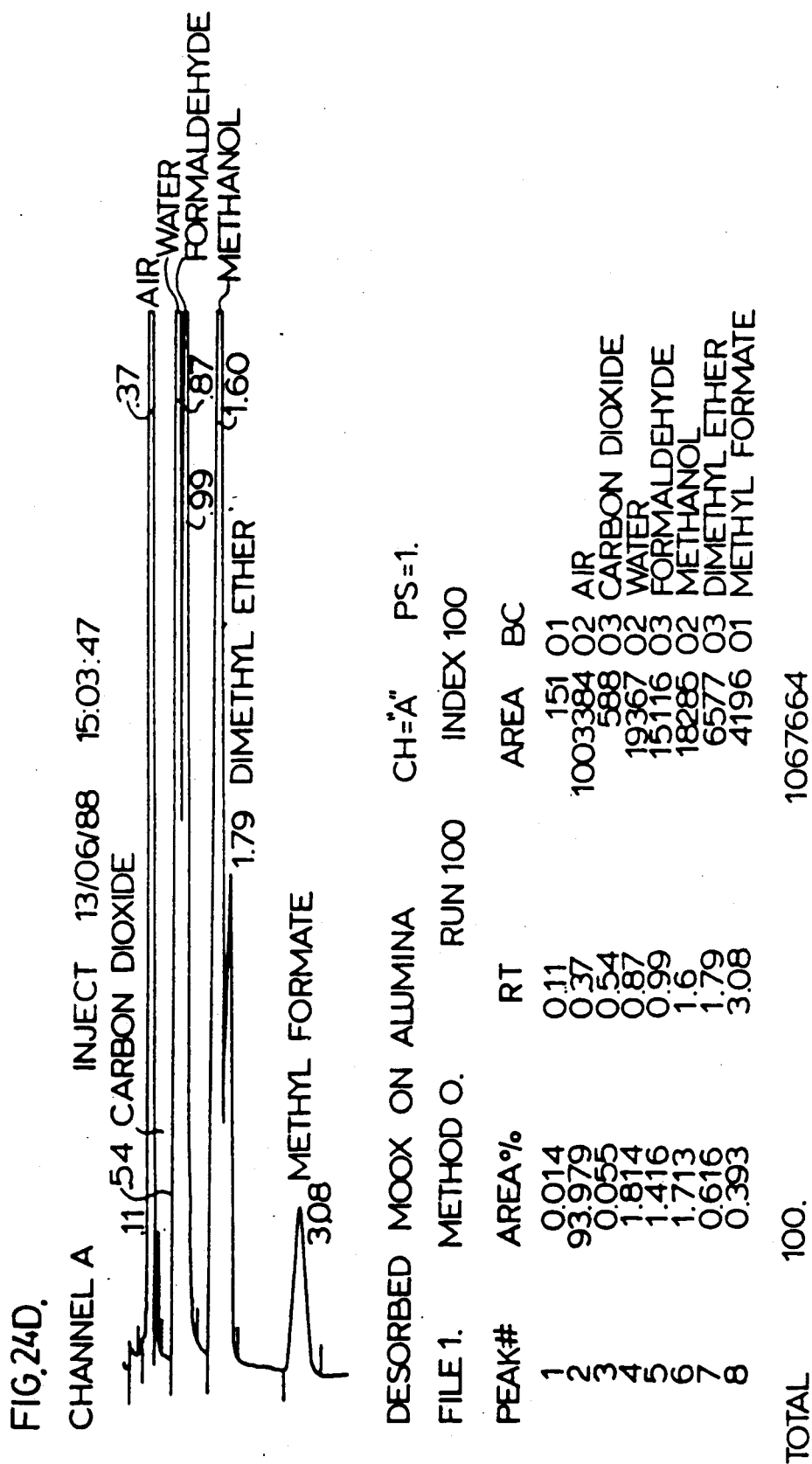

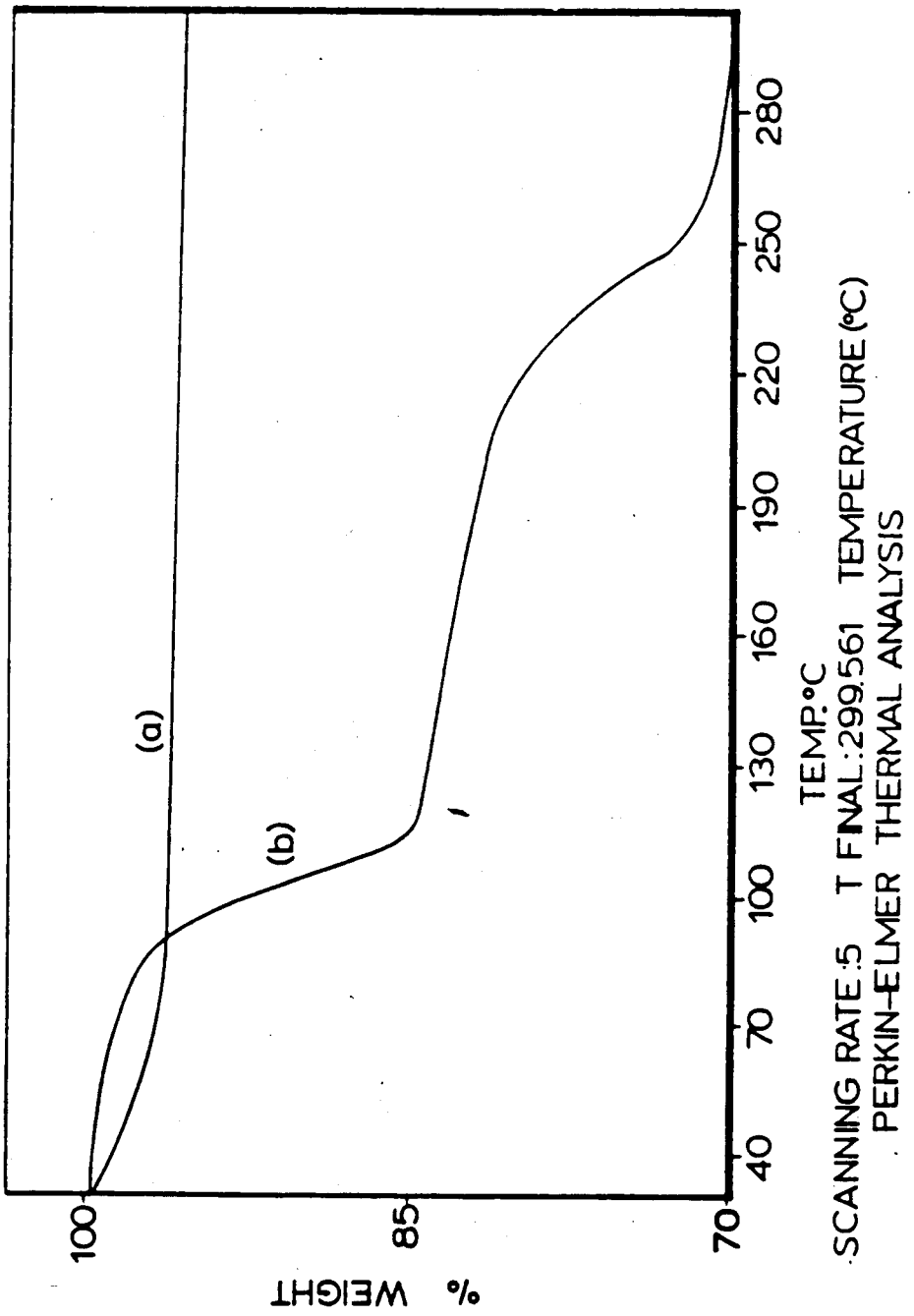

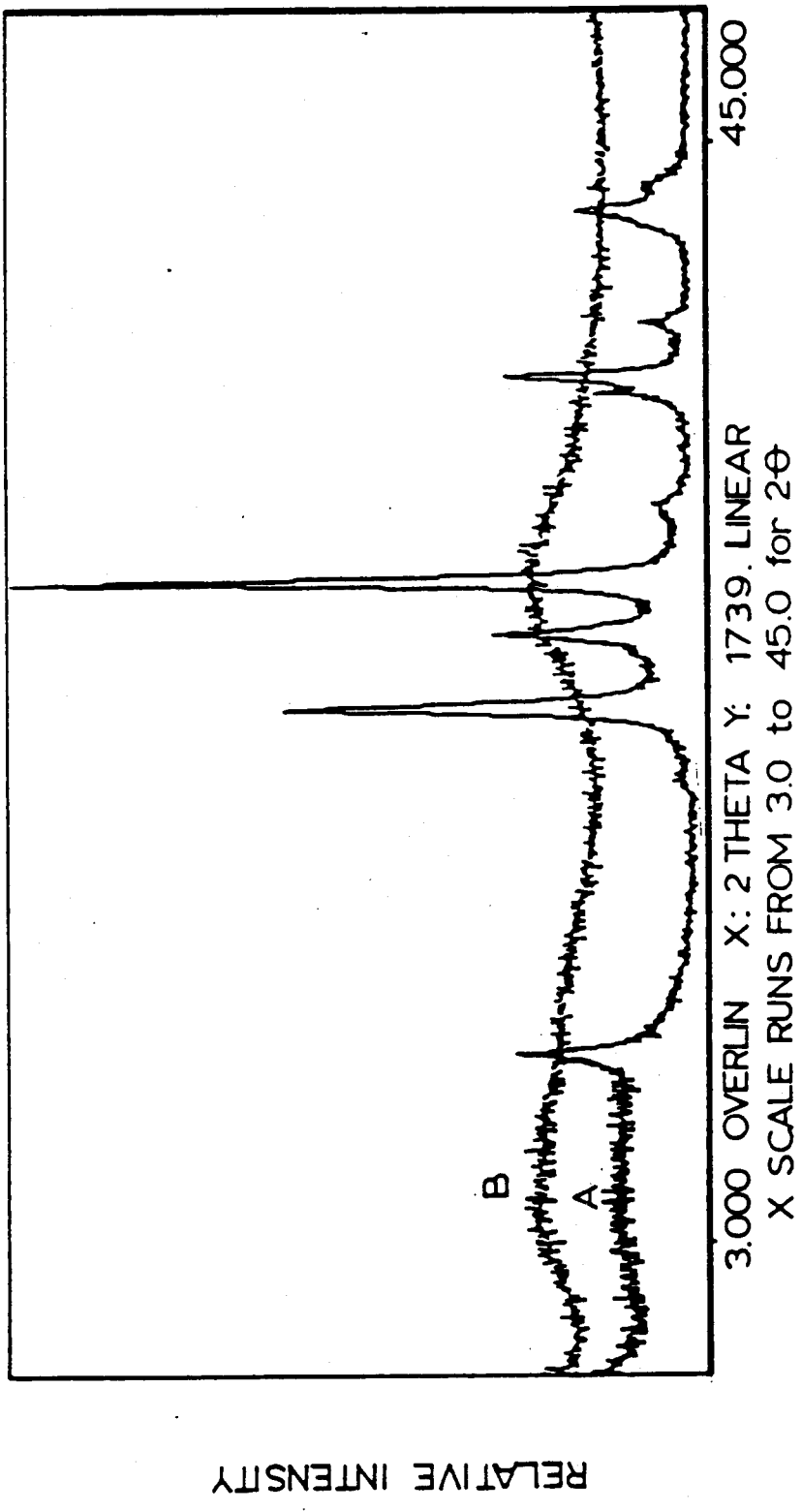

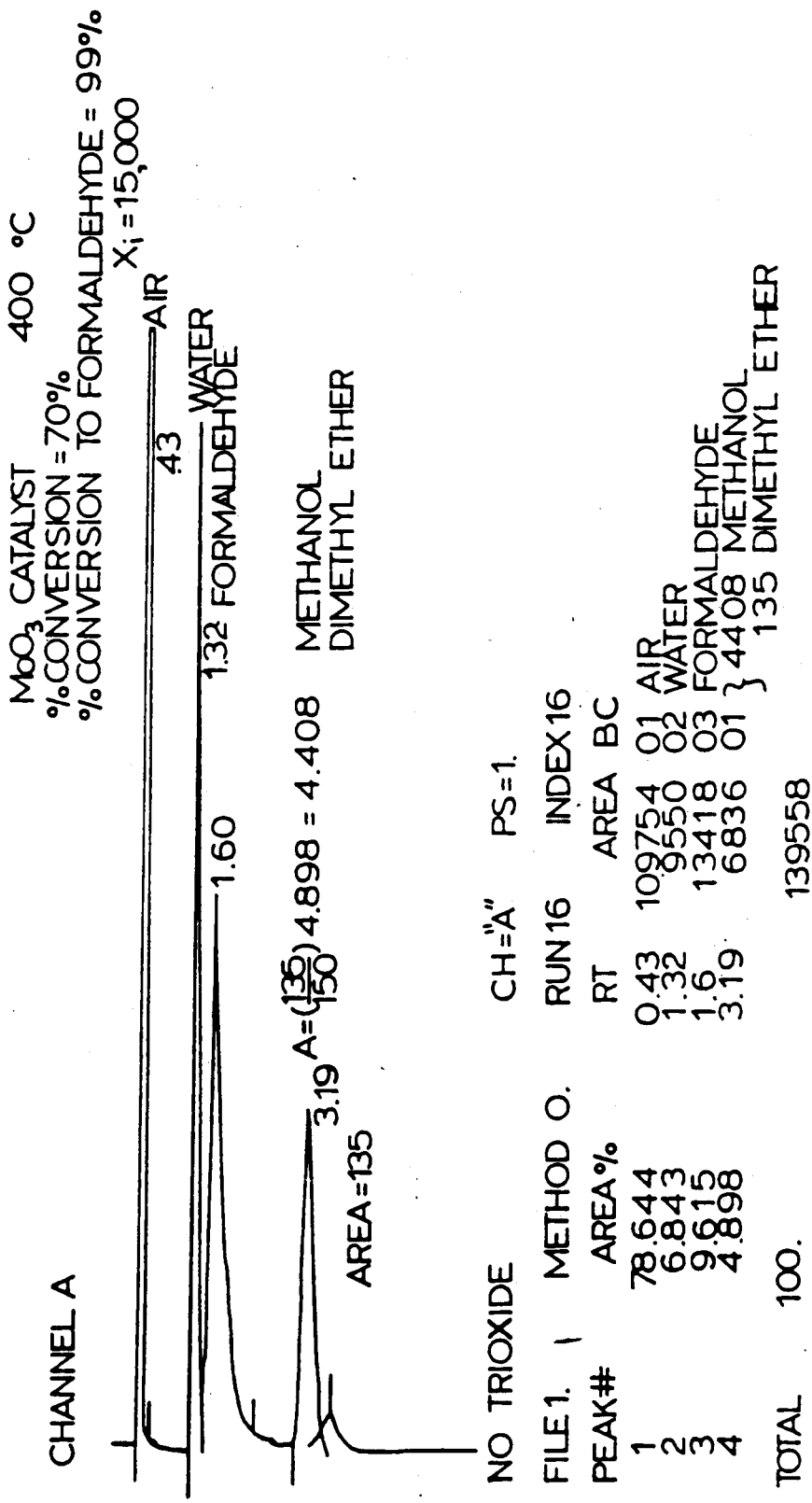

CHANNEL A

10% $MoO_3$ on ALUMINA
COMMERCIAL PREPARATION
280°C
% CONVERSION = 97%
% CONVERSION TO FORMALDEHYDE = 92%    $X_i = 63,000$

10% MOO3/AL2O3-COMMERCIAL
FILE 1.   METHOD 0.   RUN 177   INDEX 177   CH="A"   PS=1.

| PEAK# | AREA% | RT | AREA | BC | |
|---|---|---|---|---|---|
| 1 | 0.000 | 0.08 | 93 | 01 | DUE TO SAMPLE INJECTION |
| 2 | 93.802 | 0.34 | 1101071 | 02 | AIR |
| 3 | 0.208 | 0.52 | 2436 | 03 | $CO_2$ |
| 4 | 3.415 | 0.9 | 40087 | 02 | WATER |
| 5 | 2.182 | 1.02 | 25617 | 09 | FORMALDEHYDE |
| 6 | 0.154 | 1.79 | 1811 | 06 | METHANOL |
| 7 | 0.227 | 1.9 | 2670 | 06 | DIMETHYL ETHER |
| 8 | 0.003 | 2.1 | 36 | 07 | |

TOTAL   100.              1173821

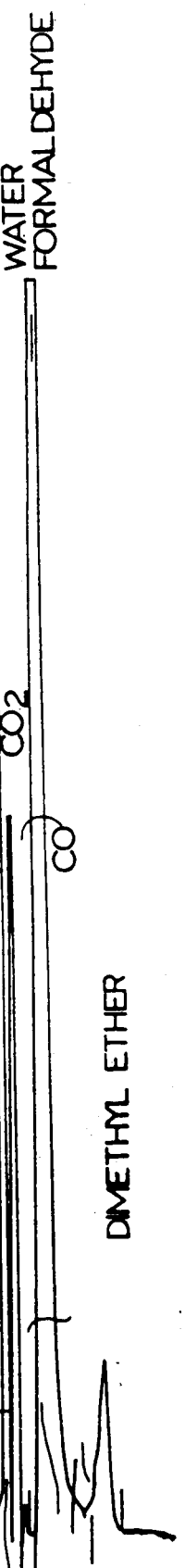
| FE-MOLYB-CAL-ALSUP | | 26/01/80 16:18:21 | | CH= "A" PS= 1. |
|---|---|---|---|---|
| FILE 1. | METHOD 0. | RUN 31 | INDEX 31 | |
| PEAK # | AREA% | RT | AREA BC | |
|---|---|---|---|---|
| 1 | 0.028 | 0.09 | 284 02 | } DUE TO SAMPLE INJECTION |
| 2 | 0.009 | 0.15 | 89 02 | |
| 3 | 94.062 | 0.32 | 961003 02 | AIR |
| 4 | 0.237 | 0.48 | 2417 02 | $CO_2$ |
| 5 | 0.013 | 0.6 | 135 03 | CO |
| 6 | 3.71 | 0.83 | 37907 02 | WATER |
| 7 | 1.69 | 0.94 | 17262 08 | FORMALDEHYDE |
| 8 | 0.001 | 1.34 | 8 05 | |
| 9 | 0.251 | 1.77 | 2564 06 | DIMETHYL ETHER |
TOTAL  100.         1021669
FIG. 30.   10 wt% $Fe_2(MoO_4)_3/MoO_3$ ON 280°C
ALUMINA
% CONVERSION = 100 %
% CONVERSION TO FORMALDEHYDE = 92%

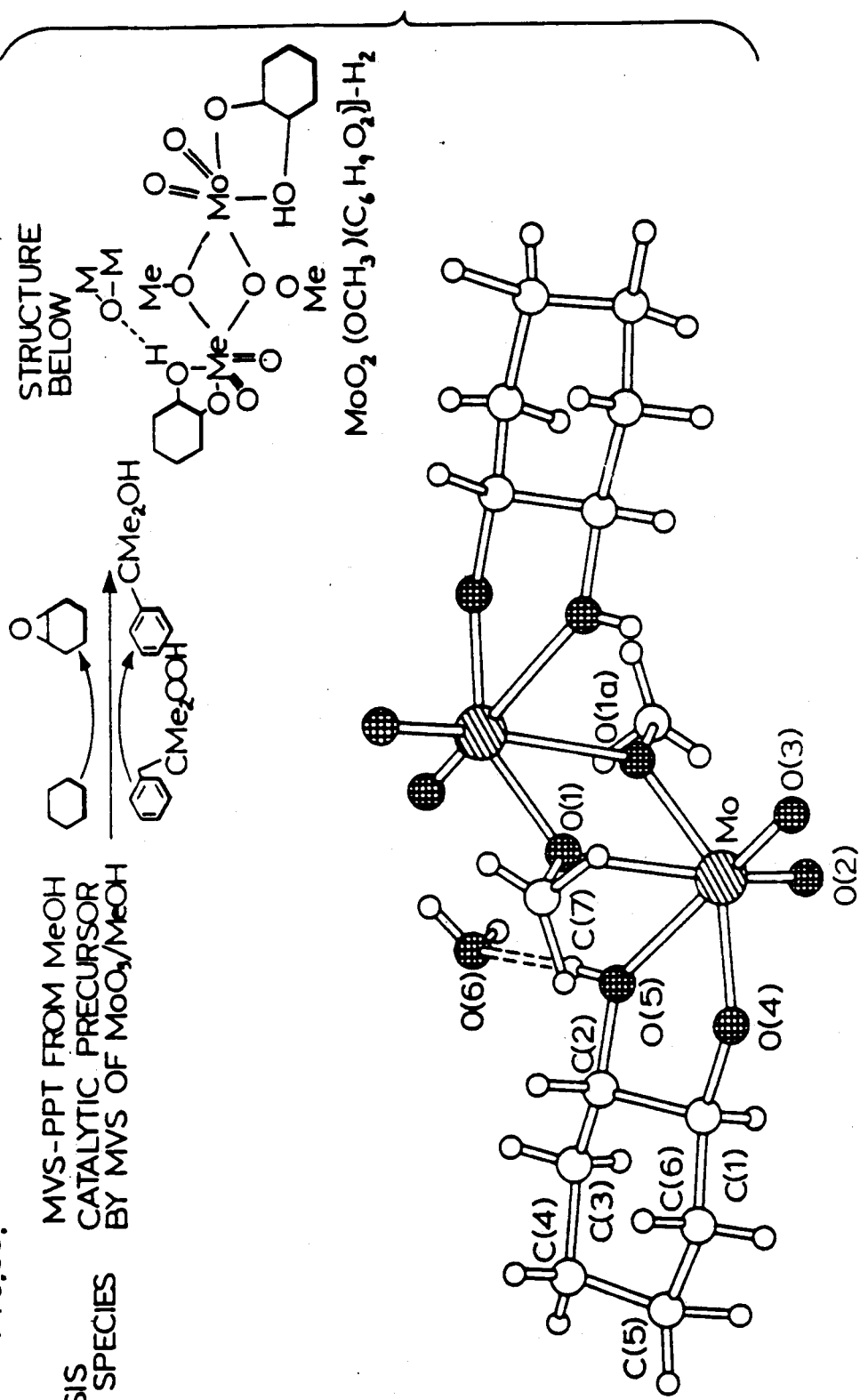
FIG.33. X-RAY ANALYSIS OF A DERIVED SPECIES — MVS-PPT FROM MeOH CATALYTIC PRECURSOR BY MVS OF $MoO_3$/MeOH

COCONDENSATION OF METAL OXIDES IN ORGANIC SOLVENTS FOR DEPOSITION ON SOLID SUPPORTS

This application is a continuation-in-part of U.S. patent application Ser. No. 217,010 filed July 8, 1988, now abandoned.

FIELD OF THE INVENTION

This invention relates to solid and liquid phase metal oxide catalysts for performing heterogeneous phase reactions and processes for their preparation. Specifically, this invention relates to the preparation of improved metal oxide catalysts by cocondensation in a liquid solvent and dissolution of the metal oxide into the solvent to form a solvated complex. The dissolved metal oxide catalyst may then be dispersed onto a solid support.

BACKGROUND OF THE INVENTION

Industrial heterogeneous catalytic systems are normally fabricated by the wet impregnation method. In the wet impregnation method, metal salts are dissolved in solvents and deposited on solid supports by evaporation of the solvents A calcination at high temperature ($\geq 500°$ C.) in air converts the metal salts to metal oxides dispersed on the surface of the solid supports. For example, solutions of ammonium molybdate and nickel nitrate (or cobalt nitrate) in appropriate concentrations deposited on $\gamma$-alumina give widely used nickel oxide (cobalt oxide)-molybdenum oxide/aluminum oxide industrial catalysts for hydro-refining heavy oil.

As it is known, by those skilled in the art, that the efficacy, efficiency and selectivity of catalysts depends on the composition, dispersion and surface area of the catalysts. These factors are of paramount importance to the activity and selectivity of the catalysts. The wet impregnation method provides an excellent methodology for metal catalysis, especially for zerovalent metals, but it does not provide the same quality of fabrication for metal oxide catalysts. The additional size and higher valency of metal oxides causes them to clump and aggregate, thereby interfering with the fine, homogeneous, dispersion of nuclear units required for optimal catalytic activity.

An alternative methodology for preparing both liquid phase and solid phase catalysts is by metal vapour synthesis (MVS). The catalytic reagents are vaporized using an electron beam gun or resistive heating. The technology for vaporizing metal atoms is well developed and even refractory metals, such as tungsten (mp 3410° C. at 1 atm), can be vaporized using an electron gun. At the present time, commercially available apparatus and equipment for the vaporization of metal atoms is available in the marketplace. Two examples of commercially available equipment are the device manufactured by G.V. Planar Ltd., Sunbury-on-Thames, in the United Kingdom and the Torrovap apparatus manufactured by Torrovap Industries, Inc., in Canada. The use of metal vaporization for the preparation of zerovalent metals for deposition on solid supports has been shown by Dr. Geoffrey A. Ozin. Dr. Ozin is the inventor or co-inventor of the following patents: U.S. Pat. No. 4,552,855 for zeolite-metal catalysts; U.S. Pat. No. 4,569,924 for carbon-metal catalysts; U.S. Pat. No. 4,292,253 for organo-metal catalysts.

Attempts to use metal vapour synthesis on metal oxides to fabricate catalysts have not been previously described. One reason may be that many metal oxides are highly ionic in nature and tend to decompose upon attempted vaporization. However, some metal oxides such as molybdenum trioxide are known to be volatile without decomposition. It is shown in one preferred embodiment of the present invention that molybdenum trioxide, under appropriate reaction conditions, can be vaporized, cocondensed and precipitated using MVS technology to produce a stable heterogeneous catalyst. To the extent that other metal oxides would produce a mixture of metal atoms and reduced metal oxides the methodology of the present invention is still useful as these can be oxidized again once they have been precipitated. Quite surprisingly the MVS methodology is very forgiving with respect to its use on metal oxides. The ability to solvate the metal oxide into a solvent appears to be the key to this surprising success.

BRIEF DESCRIPTION AND SUMMARY OF THE INVENTION

Metal oxide catalysis is the preferred method of catalysis and is used in the majority of all catalytic commercial applications. Despite this, heterogeneous metal oxide catalysts have not been prepared by MVS. It is known that the increased size and valency of metal oxide catalysts give particles that clump or aggregate when used in the current wet impregnation technique for metal oxide catalyst preparation. In other words, the crystalline structure of the multivalent metal oxide molecules is not broken down into individual or small clusters of metal oxide molecules. Therefore the fine dispersion desired for optimum catalytic activity is impeded. If this crystalline structure could be broken down into smaller particulate units then enhanced dispersion and orientation of the catalytic units could be achieved. However, it is known by those skilled in the art that the activity of metal oxides is expected to increase dramatically as the particle size approaches 10 nm. For particle sizes below 10 nm even greater activity would be expected.

According to one aspect of this invention the use of MVS for the preparation of metal oxide catalysts permits the preparation of new catalytic species which likely have a particle size in the desired optimum low range. The initial metal oxide starting reagents may not be the same metal oxide species present in the resultant catalyst product because of the interaction between the solvent and the metal oxide or oxides present. This offers the further advantage of generating potentially new catalytic species. The increase in activity and selectivity concurrent with these developments could have considerable commercial importance in the petroleum industry. These unique compositions may be of interest for reasons other than particle size.

Certain metal oxide catalysts, such as molybdenum oxide catalysts and nickel oxide catalysts, provide essential roles in organic transformations by all industrial companies currently using heterogeneous catalysts. Multi-component catalysts can be fabricated by the co-deposition of metals and metal oxides or by the co-deposition of different metal oxides. The ability to deposit, in a controlled fashion a finely layered composition in such multi-component catalysts has useful applications for both semi-conductors and in electronics.

The use of molybdenum oxide catalysts in the hydrodesulphurization of petroleum is one of the most significant heterogeneous catalytic reactions employed in the world. The numerous roles for molybdenum metal oxide catalysts are described in detail by Dr. J. Haber in his review paper entitled "The Role of Molybdenum in Catalysis" published by Climax Molybdenum Co. Ltd., Imperial House (1981). Some of the chemical reactions in which molybdenum catalysts are used include reactions with molecular oxygen, oxidation with other oxidants, isomerization, etherification, disproportionation, polymerization, addition, and decomposition.

Metal oxide catalysts bound to solid phase supports have not been prepared by prior dissolution of the metal oxide. Past attempts to dissolve metal oxide crystals in suitable solvents to prepare a stable metal oxide catalyst have been unsuccessful. One example is the inability of previous researchers to solvate solid molybdenum trioxide in methanol to form a stable sol. DeKock, as discussed in the publication of C. W. DeKock and L. V. McAfee, "Co-condensation Products of Molybdenum Trioxide Vapor with Methanol, Water and Tetrahydrofuran" Inorg. Chem. 1985, 24:4293-4298, used the MVS methodology to vaporize molybdenum trioxide into methanol to obtain a molybdenum methoxy oxide product. However under their reaction conditions precipitation occurred immediately. This was not surprising since it is generally known that metal oxides quickly precipitate out of solution and stable, solvated complexes of molybdenum metal oxides have never been achieved. The precipitation of metal oxides out of solution continues to hinder the development of new and better catalysts.

It is one aspect of the present invention that through the use of metal oxide vaporization, the molybdenum trioxide polymer crystals can be broken into a molybdenum trioxide trimer which under suitable reaction conditions form methoxy oxide species in excess methanol. In accordance with one aspect of the present invention, through the combination of excess methanol solvent and MVS, stable preparations of homogeneous solutions of molybdenum oxide in methanol, for use as molybdenum oxide catalysts, have been prepared. The resultant molybdenum methoxy oxide catalytic solution contains solvated molybdenum complexes and can be used as a catalyst in the homogeneous liquid state or it can be used for subsequent dispersion on a solid phase support. Once the molybdenum trioxide vapour is dissolved in the methanol solution the methoxy oxide species formed can then readily be dispersed onto the solid phase support eliminating previous difficulties of aggregation and clumping inherent with the wet impregnation methodology.

Solid phase supports are used in catalysis for a number of reasons. The support renders the finely dispersed catalytic species insoluble thereby allowing rapid product separation from the catalyst bed or column. The surface of the support also provides a surface upon which the catalytic units can be finely dispersed to form a thin film over the surface of the support. The dispersion of the particles and orientation of the particles on the support surface enhances the catalytic efficiency of the supported catalytic units.

Furthermore, the surface of the support provides an area for binding the catalyst. The nature of this binding is still not well understood. It is known that some catalysts will bind to their solid phase supports through covalent bonding, while others will bind by non-covalent means. Still other solid phase supports, such as the zeolite materials, provide cavities within which the catalysts of suitably small size can be trapped and these cavities provide an area for the subsequent catalyst substrate reaction. While zeolites do provide areas of entrapment, catalysts may also be bound to zeolite materials by covalent and non-covalent means. For small zerovalent metals, the use of zeolite pockets would be favored. However, with metal oxides of multivalency it is possible that the surface of the zeolite is also used in the binding and attachment of the catalysts to the supports.

In this patent application, the terms binding and bound, in relation to the catalyst on the support, are intended to include all aspects of catalyst support binding whether the binding occurs covalently, non-covalently or by some other means such as entrapment in zeolite pockets. The type of support chosen for catalytic binding will vary with the type of catalysts prepared. In turn, the type of catalyst prepared will vary with the solvent selected for use for dissolution of the catalyst. Further, the terms "dissolved, dissolution and the like" when used to describe the cocondensed catalyst in the solvent, are intended to include the solvation of the catalyst in the solvent.

In accordance with one aspect of the invention, a process for preparing metal oxide catalysts having one or more metal oxide species bound to or entrapped on a solid phase support which comprises:

vaporizing a metal oxide or two or more metal oxides;

cocondensing said metal oxide or two or more different metal oxides with a suitable organic liquid solvent which is capable of solvating said metal oxide or metal oxides;

dissolving said metal oxide or metal oxides in said solvent to form a solvated complex in said liquid solvent;

contacting said solvated complex with a solid phase support material so as to cause binding or entrapment of said solvated metal oxide specie or metal oxide species to said solid support; and removing excess liquid solvent or solution.

In accordance with another aspect of the invention, a process for preparing metal oxide catalysts having one or more metal oxide species which comprises:

vaporizing a metal oxide or two or more metal oxides;

cocondensing said metal oxide or two or more metal oxides with a suitable organic liquid solvent which is capable of solvating the metal oxide or metal oxides;

dissolving said metal oxide or metal oxides in said solvent to form a solvated complex in said liquid solvent;

precipitating said metal oxide specie or metal oxide species solvated in said solvent; and removing excess solvent or solution.

In accordance with an aspect of the invention, a heterogeneous molybdenum oxide catalyst having a particle size of between 1 nm and 300 nm.

Other and further advantages and features of the invention will be apparent to those skilled in the art from the following detailed description thereof, taken in conjunction with the accompanying drawings.

BRIEF DESCRIPTION OF THE DRAWINGS

Preferred embodiments of the invention are shown in the drawings wherein:

FIGS. 3a, 3b and 3c are gas chromatograph tracings of the conversion of methanol to formaldehyde at three different furnace temperatures for catalyst B illustrated in FIG. 1:

FIG. 5 shows a gas chromatograph tracing of the conversion of methanol to formaldehyde for catalyst D illustrated in FIG. 1 which was preheated to 550° C. in air;

FIG. 7a, 7b and 7c are the standardized tracings for gas chromatographs;

FIG. 21 is an IR spectrum of a precipitate from $MoO_3/CH_3OH$ solution prepared using MVS;

FIG. 22 is a Raman spectrum of $MoO_3/CH_3OH$ catalyst precursor using MVS;

FIGS. 23a and 23b are Tables of values for powder x-ray diffraction patterns indicating the d spacings (Å) and the relative intensities for $MoO_3/CH_3OH$, $Mo_2O_5(OCH_3)_2$, $Mo_2O_5(OCH_3)_2 \cdot 2CH_2OH$, $MoO_3 \cdot CH_3OH$;

FIGS. 24A, 24B, 24C and 24D are gas chromatograph traces of the catalysts summarized in Table 2; these GC tracings at fixed temperature for supported commercial preparations of molybdenum trioxide catalyst and for MVS preparations of supported molybdenum trioxide catalysts;

FIG. 25 is a thermogravimatic analysis (TGA) trace of the MVS precipitate, the molybdenum methoxy oxide species, (a) $SiO_2$ supported and (b) unsupported;

FIG. 26 is the XRD pattern of the MVS catalyst precipitated and photoactivated and MVS precursor precipitated;

FIG. 27 is the GC tracing for the conversion of methanol to formaldehyde using a commercial preparation of molybdenum trioxide as the catalyst;

FIG. 30 is the GC tracing for the catalyst $Fe_2(MoO_4)_3/MoO_3$ supported on alumina used to catalyze the conversion of methanol to formaldehyde;

FIG. 33 is the molecular structure by X-ray single crystal analysis of a derived species $[MoO_2(OCH_3)(C_6H_9O_2)]_2 \cdot H_2O$.

DETAILED DESCRIPTION OF THE PREFERRED EMBODIMENTS

Figure 1:
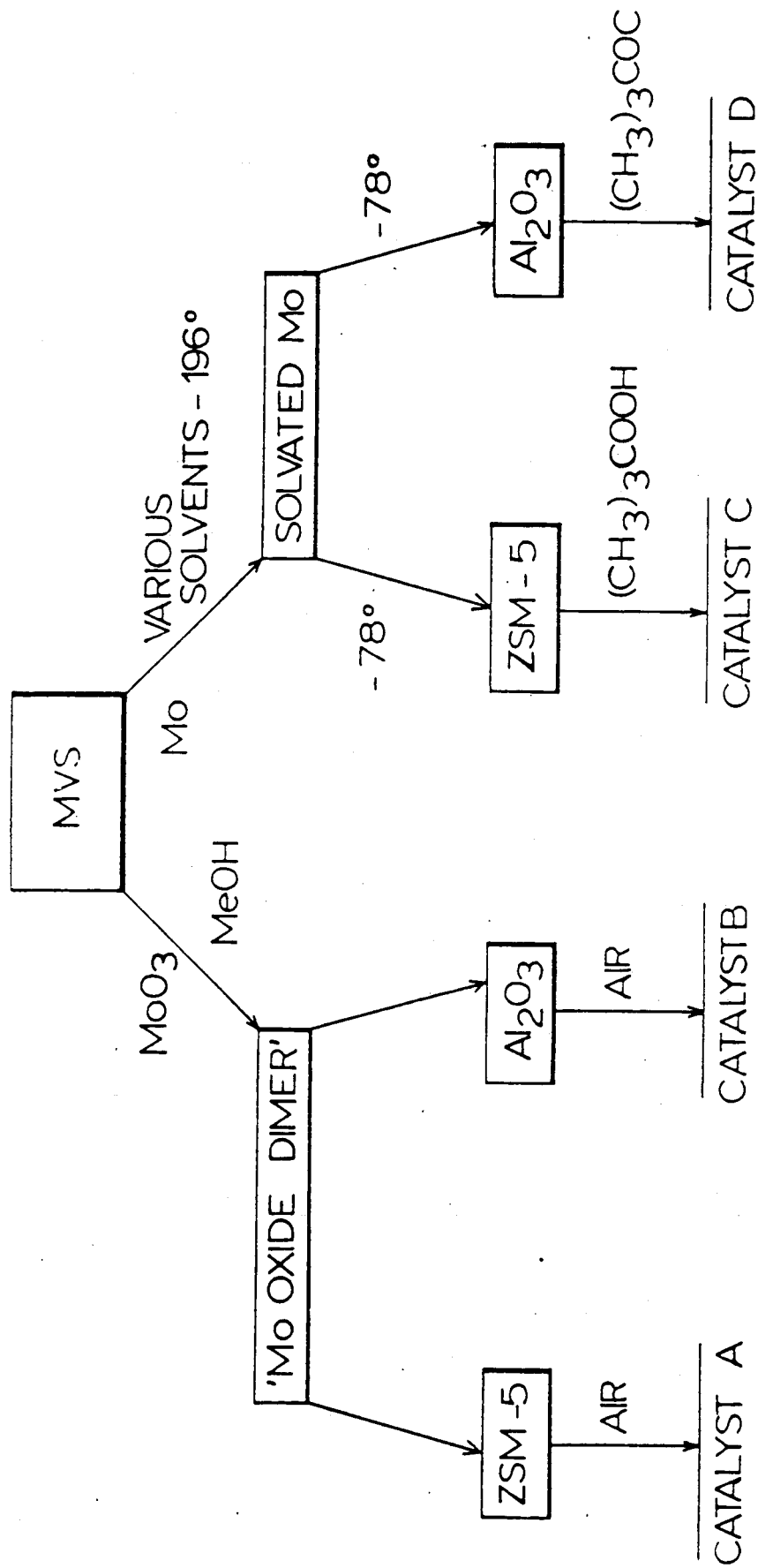
FIG. 1 is a schematic diagram illustrating the pathway for formation of four different solid support catalysts using MVS technology.

The preferred embodiments described herein refer to the preparation of stable heterogeneous molybdenum oxide catalysts. However, it is understood that the use of the MVS methodology of vaporizing, cocondensing and dissolving into a suitable solvent could be applied to any metal oxide. For example, other preferred metal oxide include those selected from the group consisting of vanadium (V) pentoxide, magnesium oxide, chromium (III) oxide, manganese oxide, iron (II) oxide, cobalt oxide, indium oxide, tin (IV) oxide, lanthanum oxide, tungsten oxide and a combination of molybdenum oxide and vanadium (V) pentoxide. The vaporization step breaks down the crystalline structure of the metal oxide and the metal oxide units of smaller size can be solvated by dissolution into a suitable solvent under suitable reaction conditions. The use of the solvent is an important element in the successful achievement of a supported metal oxide catalyst having a finely dispersed thin metal oxide layer of catalyst on its surface.

The use of a solvent in preparing a catalyst offers benefits other than decreased particle size. The interaction between the metal oxide molecules and the solvent itself provides opportunities for generating catalytic species previously not known. Also, the use of a solvent allows for greater control in laying the catalytic species on to a support. One has further control over the orientation of these molecules as they are laid down. This level of control is not available in other techniques such as sputtering.

It is known that the technique of sputtering can be used to generate fine catalytic dispersions as thin films over a support. However, the technique of sputtering is a technique which can only be used under dry conditions and not in the presence of one or more solvents. Furthermore, sputtering is essentially a random event whereas in the present invention the generation of a finely dispersed catalyst within a solvent allows for a more controlled lying down of the catalytic species on to the support. A further advantage of the present methodology which is not possible using the sputtering technique is the ability to combine more than one starting reagent and thereby manipulate the composition of the catalyst so as to maximize its activity. Using the method of the present invention even a small amount of an added second reagent, for example a second metal oxide or metal, could still be uniformly laid down over the surface of the support in a controlled manner. Even for unsupported catalysts generated using the method of the present invention a uniformed dispersion of all combined reagents would be expected within the mixture. With sputtering the flux of the materials used is large. With the MVS technology of the present invention interactions between molecules are negated before they hit the cocondensing surface. In MVS the interaction between the metal oxide(s) and/or metal(s) and the solvent keeps the metal oxide(s) and/or metal(s) dispersed until they are laid down thereby increasing the porosity of the catalysts created. By manipulating the solvent interaction with the metal oxide it would be possible to control the arrangement of molecules on the surface of the support. With sputtering one gets a random distribution of molecules over the surface with no control over spacing. The MVS methodology of the present invention permits enhanced porosity, enhanced dispersion, reduced particle size and the potential to create many new and novel catalytic species which result from the interaction between the initial reagent (s) and the solvent used.

It is also understood that while these preferred embodiments relate to the production of heterogeneous catalysts, homogeneous catalysts could be produced in similar fashion.

It is further appreciated that after precipitation catalysts prepared in accordance with the present invention may be further activated by using well known techniques such as thermal activation and photoactivation.

In accordance with one aspect of this invention, the metal vapor synthesis (MVS) technique is employed to generate dimolybdenum catalysts supported on solid supports such as aluminum oxide. It is appreciated that other solid supports could also be used.

Solid supports for use in catalysis fall into three general categories. First there are oxide solid supports such as alumina, zinc oxide, silica, titania and zirconia. Second, there are solid supports which are useful in catalysis because they form small cavities in which only one or a few nuclear units of the metal oxide catalyst will fit thereby increasing the dispersion of the catalyst by segregating the nuclear units through entrapment in these small cavities. Zeolites are one example of such a solid support. Other examples include pillared clays and sols. This would include both naturally occurring and synthetic sols. A sol is a substance, whether gas, liquid or solid, dispersed in a continuous gas, liquid or solid medium; the system of the dispersed and continuous phases. In the context of a solid support, an example is silica gel (hydrated silica). It is neither a solution nor a suspension. Both zeolites and sols are naturally occurring although they can also be prepared synthetically. An example of a natural zeolite is Faujasite. The third category of solid supports are inert supports such as carbon, glass and metals The preferred embodiments of this invention relate to the use of molybdenum oxide catalysts in the production of formaldehyde by the partial oxidation of methanol. It is appreciated that the metal vapor syntheses (MVS)-generated molybdenum systems, prepared by evaporating molybdenum and/or molybdenum trioxide onto an aluminum oxide or zeolite solid support, are also potential catalysts for processes such as olefin metathesis, olefin epoxidation, oxidative coupling, alkane oxidation and hydrodesulphurization.

The vaporization of molybdenum trioxide for use as molybdenum oxide catalysts was performed using MVS equipment purchased from Torrovap Industries, Inc. The Torrovap MVS system consists of a rotating 5 L reaction flask, immersible in liquid nitrogen, in which there are axially mounted resistive or electron beam (E-gun) evaporation sources. A high speed pump assembly maintains a high vacuum in the system. MVS syntheses involve metal oxide vapor rotary solution or cocondensation experiments, in which the reaction products are transferred anaerobically from the reaction flask for subsequent examination and experimentation. Unique features of this equipment include cryopumped E-guns, a dismountable rotating vacuum seal assembly operable at $10^{-7}$ torr, and an in situ quartz microbalance metal flow monitor.

Vaporization of refractory metals such as molybdenum or tungsten with the electron-gun are compatible with the use of solutions of involatile substrates. The vaporization of two metal oxides, two metals, or a combination of metals and metal oxides in the same preparation is readily achieved with the dual controls. It is recognized that in some instances it may be preferred to evaporate each metal or each metal oxide separately and then subsequently combine the two at the time of dispersion onto a solid support. The decision as to which metals and metal oxides to select for cocondensation and in what combination will depend on the type of catalyst to be performed.

Metal oxides such as, molybdenum trioxide, and/or metals, such as molybdenum, are cocondensed by high voltage resistive heating or electron-gun in the MVS Torrovap at $-196°$ C. into a suitable solvent. In this preferred embodiment molybdenum trioxide was cocondensed into excess methanol; other organic solvents, such as $MeC_6H_{11}$ and $(CH_3)_2CO$ could also be used. These solvates are then deposited onto a suitable support such as alumina or zeolite at $-78°$ C. or maintained for use as unsupported catalysts by precipitation and removal of excess solvent or solution. Metals, such as molybdenum, deposited in this fashion, can then be oxidized, using t-butyl hydroperoxide or other suitable oxidant.

Figure 2A:
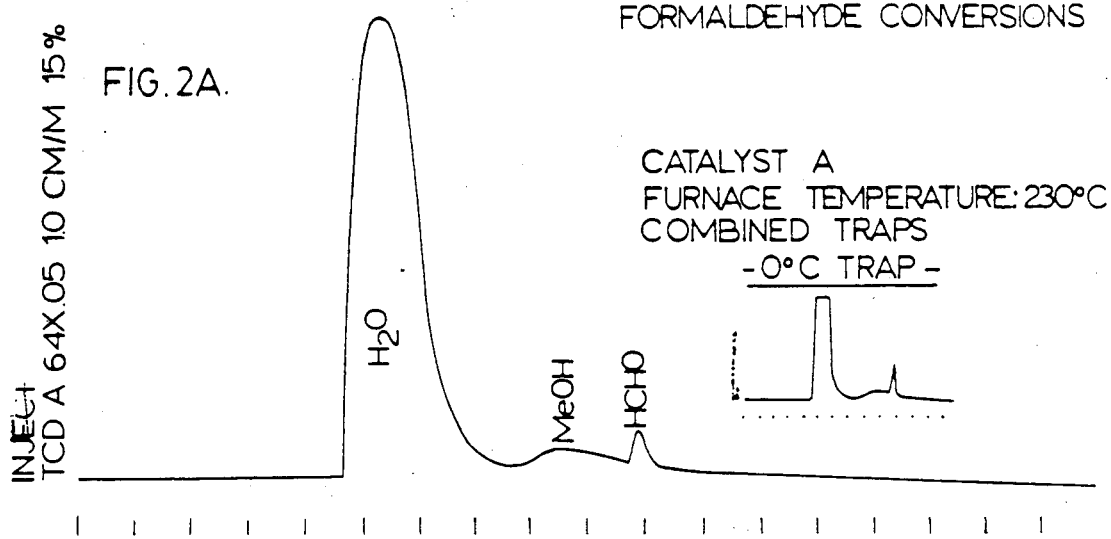
FIGS. 2a, 2b and 2c are gas chromatograph tracings of a methanol to formaldehyde conversion at three different furnace temperatures for catalyst A illustrated in FIG. 1.
Figure 2B:
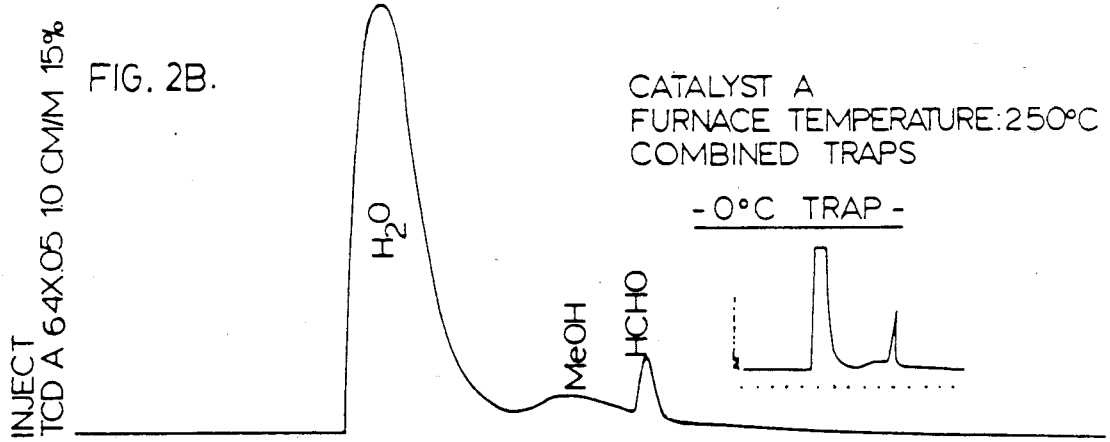
Figure 2C:
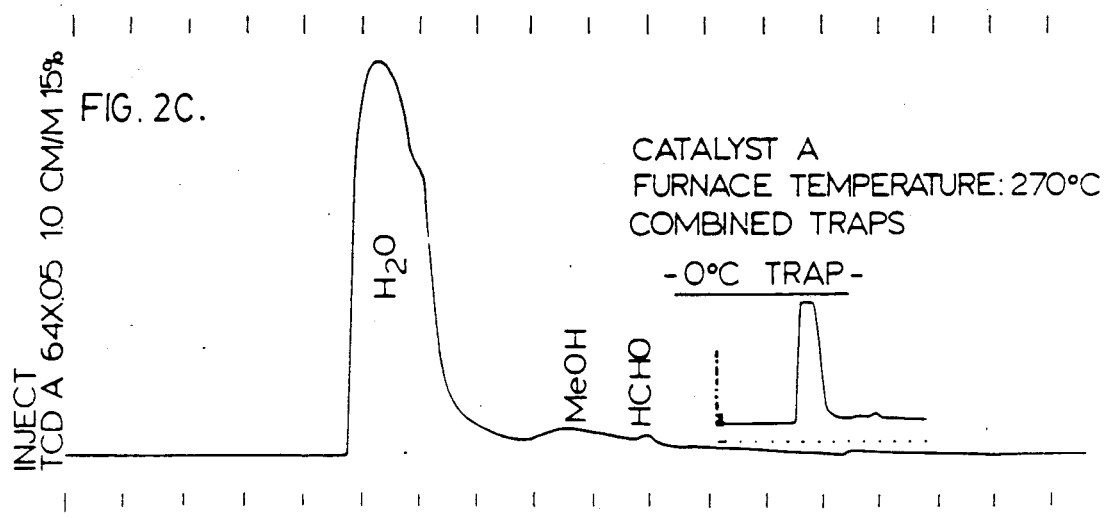
Figure 4A:
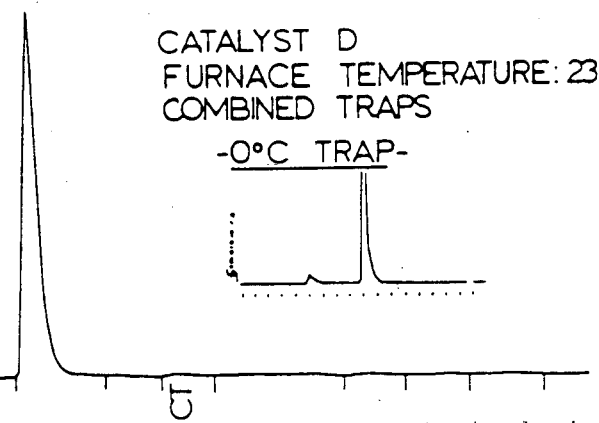
FIGS. 4a, 4b and 4c are gas chromatograph tracings of the conversion of methanol to formaldehyde at three different furnace temperatures for catalyst D illustrated in FIG. 1.
Figure 4B:
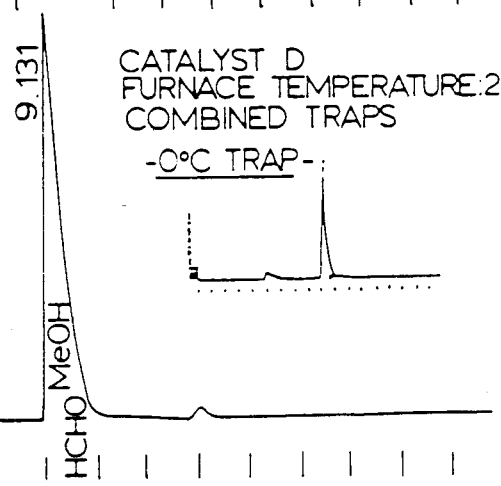
Figure 4C:
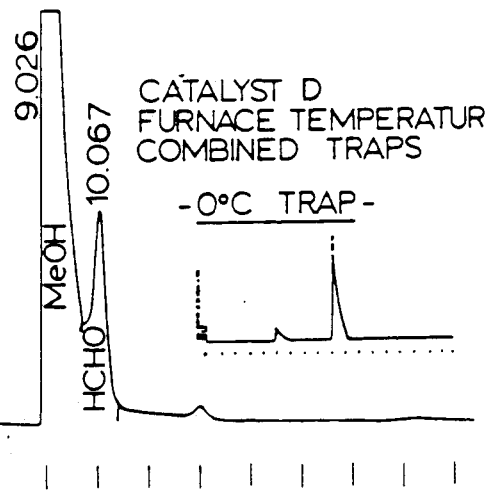

FIG. 1 schematically illustrates the pathways used in preparing metal and metal oxide alumina and zeolite supported catalysts. The evaporation of molybdenum trioxide into methanol creates molybdenum methoxy oxide species which combine with the zeolite ZSM-5 in the presence of air to form catalyst "A". Gas formaldehyde using catalyst "A" are illustrated in FIGS. 2a, 2b and 2c. Similarly the molybdenum methoxy oxide species can be dispersed onto an alumina support, in the presence of air, to produce a different catalyst, catalyst "B". Gas chromatograph tracings of the conversion, of methanol to formaldehyde using catalyst "B" are illustrated in FIGS. 3a, 3b and 3c. Standard GC tracings are depicted in FIGS. 7a, 7b and 7c. The parameters used in running these gas chromatographs are set out in Table 1.

TABLE 1

| Chromatograph Parameters | |
| --- | --- |
| Gas Chromatograph: | Varian 3400 |
| Detector: | Thermal Conductivity |
| Detector Temperature: | 165° C. |
| Filament Temperature: | 195° C. |
| Attenuation: | 64 |
| Range: | 0.05 |
| Injector Temperature: | 120° C. |
| Sample amount: | 0.5 μL |
| Column: | Poropak QS 100/120 |
| Column Flow Rate: | 30 mL/min. |
| Temperature Programming | |
| Initial Column Temperatures: | 40° C. |
| Initial Column Hold Time: | 4 minutes |
| Rate of Temperature Increase after Hold: | 10° C./min |
| Final Column Temperature: | 120° C. |
| Final Column Hold Time: | 10 min. |

It is known that the molybdenum metal can also be cocondensed using the MVS system to form a solvated molybdenum solution suitable for dispersion onto an alumina or zeolite support. What has not been known and what is demonstrated in one aspect of this invention is that these supported metals can be oxidized to form new metal oxide catalysts having greater catalytic activity than the corresponding metal oxide catalysts created by wet impregnation. Gas chromatography tracings for the use of oxidized supported metals in the conversion of methanol to formaldehyde are illustrated in FIGS. 4a-4c and 5. These Figures correspond to catalyst "D" in FIG. 1. The oxidized metal supports gave, as expected, good catalytic activity given the previous expectation that the resultant metal oxide particles might be smaller, thus providing an improvement over present catalytic methodologies.

Figure 6A:
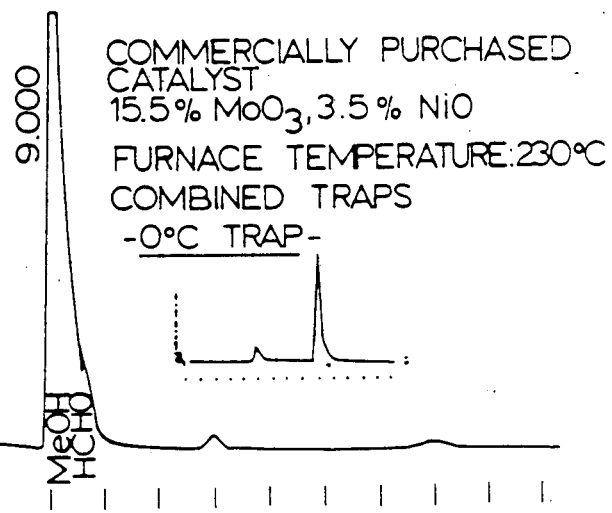
FIGS. 6a, 6b and 6c are gas chromatograph tracings of methanol to formaldehyde conversion using commercially prepared molybdenum trioxide catalyst.
Figure 6B:
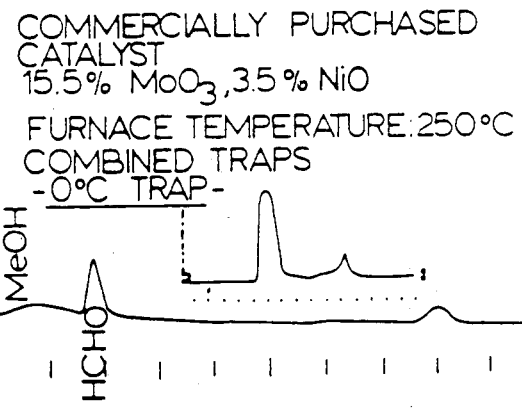
Figure 6C:
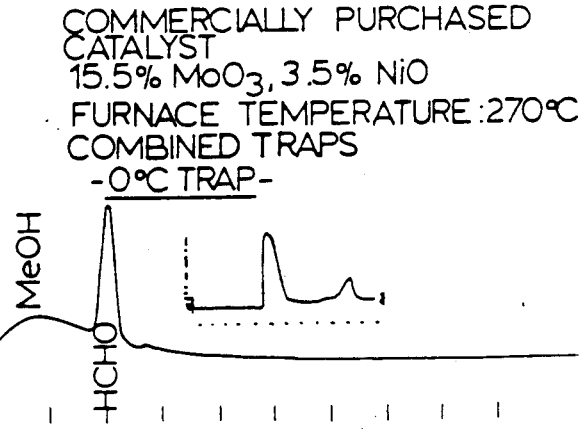

For comparison, commercially prepared catalyst was used in the standard wet impregnation methodology to convert methanol to formaldehyde. The gas chromatograph tracing for this conversion is illustrated in FIGS. 6a, 6b and 6c. A comparison between the commercially purchased catalyst (FIGS. 6a, 6b and 6c) and the MVS generated catalysts (FIGS. 2a to 5) shows enhanced catalytic activity of the MVS prepared catalysts over the commercially available catalyst. The parameters used in running these gas chromatographs are detailed in Table 1.

Figure 20A:
FIGS. 20A, 20B, 20C and 20D are scanning electron micrographs of the unsupported photoactivated MVS catalyst as compared to $MoO_3$.
Figure 20B:
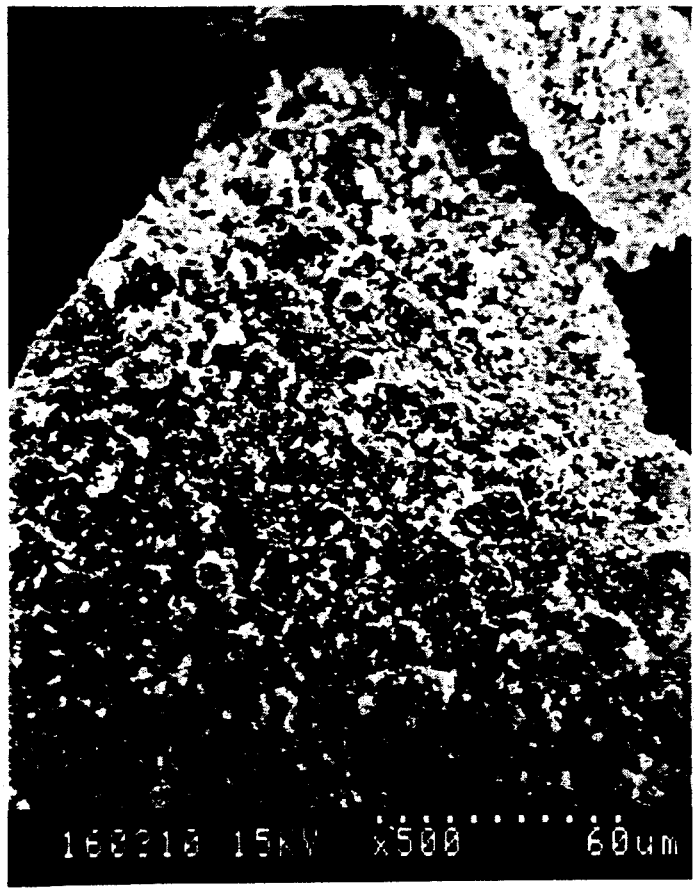
Figure 20C:
Figure 20D:
Figure 24A:
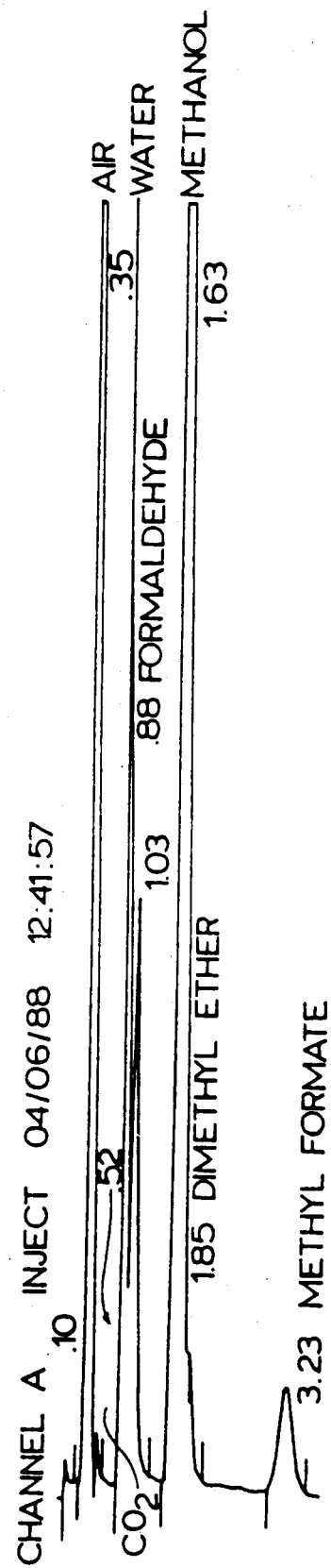
Figure 24C:
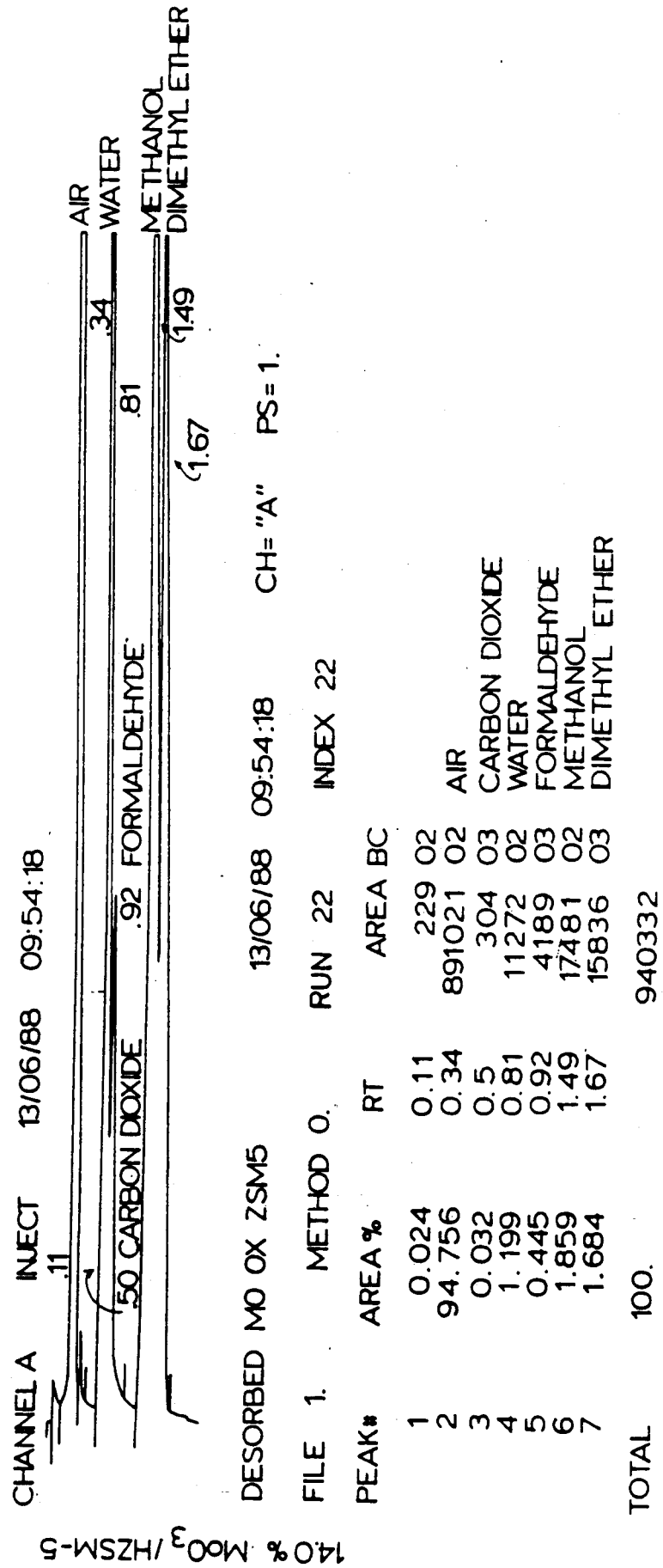

Molybdenum trioxide evaporation with the resistive heater and cocondensation with methanol gives the known methoxy oxide species of simplest formula $Mo_2O_5(OCH_3)_2 \cdot CH_3OH$ (FIG. 21, FIG. 25 and FIG. 26). Deposition of these species on ZSM-5 (A) and gamma-$Al_2O_3$ (B) give catalysts A and B respectively. These are then suitable for formaldehyde formation. Catalyst B is the most active catalyst. The improved catalytic activity demonstrated by the findings detailed above (FIGS. 2a-c, 3a-c, 4a-c, 6a-c and 24A-D; Tables 2 and 3) are believed to result from better dispersion and orientation of the molybdenum oxide species on the solid support as compared to wet impregnation methodologies. Normally the particle size of $MoO_3$ crystallites is not less than a micrometer. However, in the unsupported preferred embodiment of the catalyst particle sizes as low as 15 to 40 nanometers have been observed (FIG. 20). A comparison between a commercial $MoO_3$ preparation and the unsupported catalyst of the preferred embodiment is seen in FIG. 20A-D. FIG. 20A is a scanning electron micrograph (SEM) showing the particle size varies, but on the average it is in the micrometer range (1 to 10 $\mu$m). The particle shape is rodlike. In FIG. 20B, the unsupported photoactivated catalyst is illustrated under low magnification. It appears as very large (100 to 1000 $\mu$m) irregular shaped particles. The surface does appear to possess some degree of porosity. In FIG. 20C, a higher magnification of the surface is illustrated. Here the catalyst is composed of small irregular shaped particles which are tightly packed into a large uniform structure which possesses a high degree of porosity. The pore size distribution on the material was found to range from pores of 7 to 62 Å in radius. FIG. 20D clearly shows the particle size of the particles composing the unsupported photoactivated catalyst. The particles range in size from 15 to 40 nm in diameter. This image was produced at the magnification limit of the SEM instrument. It can be seem from these photomicrographs that the unsupported photoactivated catalyst appears unique when compared to commercial $MoO_3$. Unfortunately once the unsupported molybdenum oxide catalytic species is bound to a support such as alumina the particle size can no longer be resolved by the scanning electron microscope. However, the supported and unsupported compounds generated in accordance with the present invention exhibit very similar catalytic performance (TABLE 3 AND FIG. 31, 32).

An exact characterization of the species bound to the support cannot be determined. The catalytic properties of a catalyst depend on the orientation of the units, the spacing of the units and their particle size. It is known that the molecular species in the precursor precipitate, generated when the solvated molecules are precipitated to form an unsupported catalyst, are of the formula $MoO_2O_5(OCH_3)_2 \cdot 2CH_3OH$. It is not possible to know what the chemical formula is of the species bound to the support after the solvent is removed. However, these catalysts can be characterized by their physical properties and by their activity and selectivity as quantified below.

It is impossible to precisely describe the spacing of nuclear units on a solid support, especially since such spacings will vary with the type of support and nature of the binding. It is known to those skilled in the art that catalysts are distinguished one from the other by their catalytic activity as measured by their efficiency, selectivity and other standard testing methodologies. The increased efficiency and selectivity of catalysts A and B are further supported by the data presented in Example 1 and Table 2.

Scanning Electron Microscopy (SEM) and Backscatter Electron Imaging (BEI) are commonly employed to examine the dispersion and depositional features of supported catalysts. Silica and zeolite supports (which are similar in nature to $SiO_2$) tend to possess weak metal oxide-surface support interactions which lead to crystallite formation. The dispersion of these crystallites can be visually determined through SEM. On the other hand, alumina-based catalysts usually possess strong metal oxide-surface support interactions which lead to monolayer island coverage. In these systems particle size is difficult to determine as it tends to extend beyond the resolution limitations of normal SEM. When SEM is no longer useful, coverage can be determined by BEI. In the normal SEM mode of operation, image contrast is in response to surface charging due to atomic number or by topographic (elevational) effects. BEI monitors the energy of the backscattered electrons and thus, contrast is solely due to the atomic number, or average atomic number of surface compounds involved in the electron-surface atom collision event.

Figure 8:
FIGS. 8 through 19 are scanning electron micrographs and backscatter electron images of solid support molybdenum oxide catalysts wherein the solid support is either zeolite or alumina.
Figure 9:
Figure 10:
Figure 11:
Figure 12:
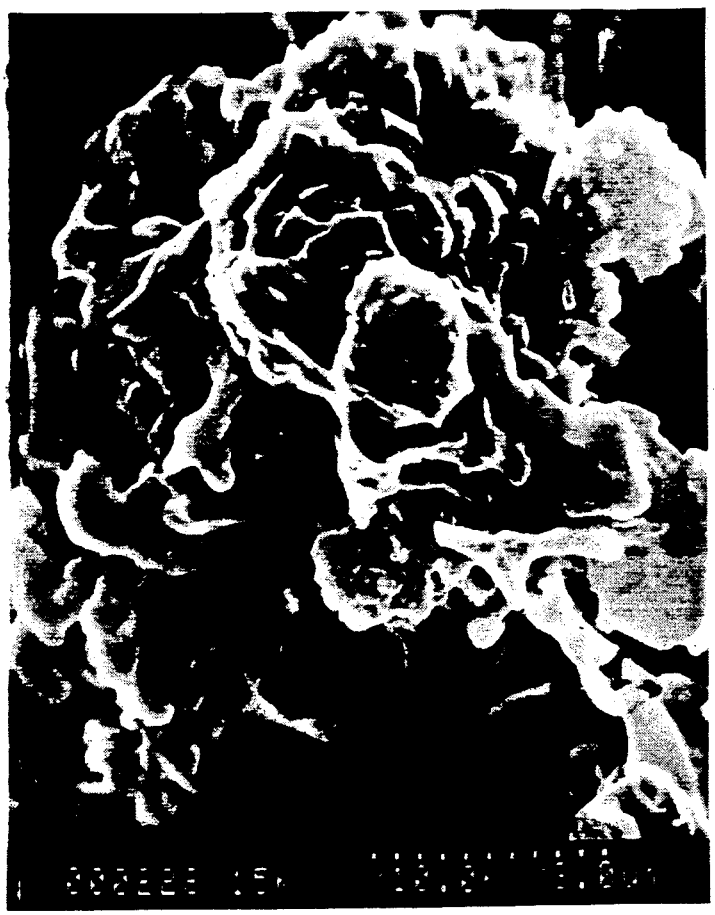
Figure 13:
Figure 14:
Figure 15:

Deposition of molybdenum methoxy oxide species onto solid supports was viewed and characterized using SEM and BEI technologies. Characteristic images of clean H-ZSM-5 are seen in FIGS. 8 and 9. Upon deposition of this species (equivalent to 8% $MoO_3$), crystallites, composed of small rod-shaped bars, are realized (FIGS. 10 and 11). Upon heating of the H-ZSM-5 supported catalyst, the crystallites disperse across the surface. At 250° C., the surface possesses a smooth appearance with the underlying H-ZSM-5 support outline visible (FIGS. 12 and 13). Further heating up to a final temperature of 550° C. (FIGS. 14 and 15) shows the formation of highly dispersed crystallites of a spiky or sheetlike character. The conclusion is that the deposition of species onto a H-ZSM-5 support leads to a highly modified surface which possesses unique catalytic qualities (catalyst A).

Figure 19:
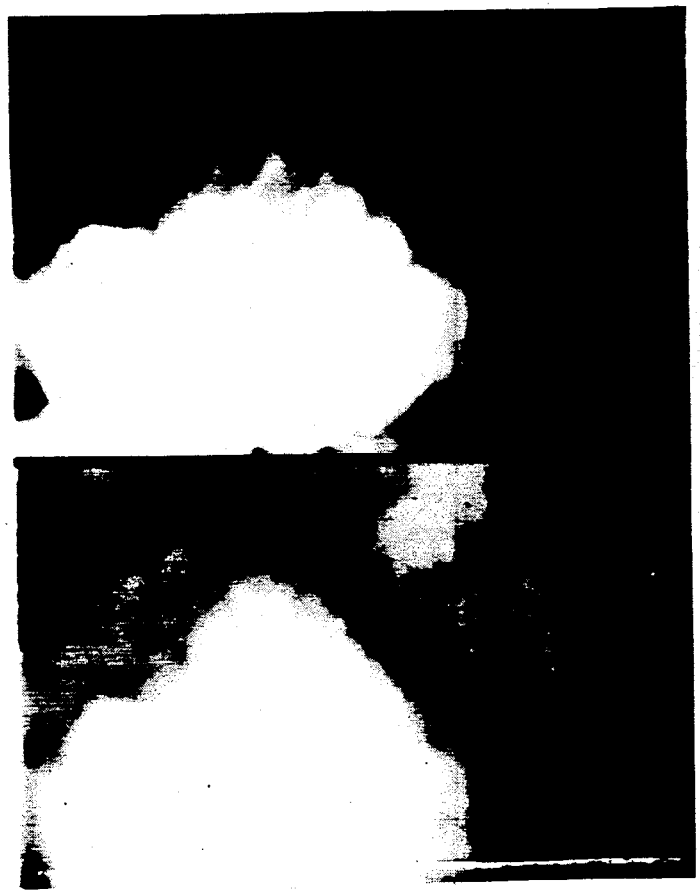

Deposition character onto alumina support shows a very different type of surface coverage. Normal SEM images of alumina supported catalysts show no conclusive evidence by themselves. Deposition appears to be the expected near monolayer island coverage. However, films are so fine they are difficult to distinguish. BEI allows the determination of areas of surface coverage BEI images show contrast by atomic number. Thus, any molybdenum species should show up as brighter areas on the supports while alumina should be noticeably darker. FIG. 19 is a split-screen SEM/BEI image of clean alumina itself. The SEM image (top half) shows a contrast due to elevational effects. The BEI image (bottom half) removes these elevational effects leading to an image of no contrast (expected if no deposit is on the support surface).

Deposition of molybdenum methoxy oxide species (equivalent to approximately 5% $MoO_3$) should appear as areas of higher contrast as compared to clean alumina areas which darken (this is due to a much lower average atomic number of alumina when compared to $MoO_3$; as well, under BEI mode, contrast is adjusted to darken areas of low atomic number with respect to areas of higher atomic number). Thus BEI can distinguish areas of coverage.

Figure 16:
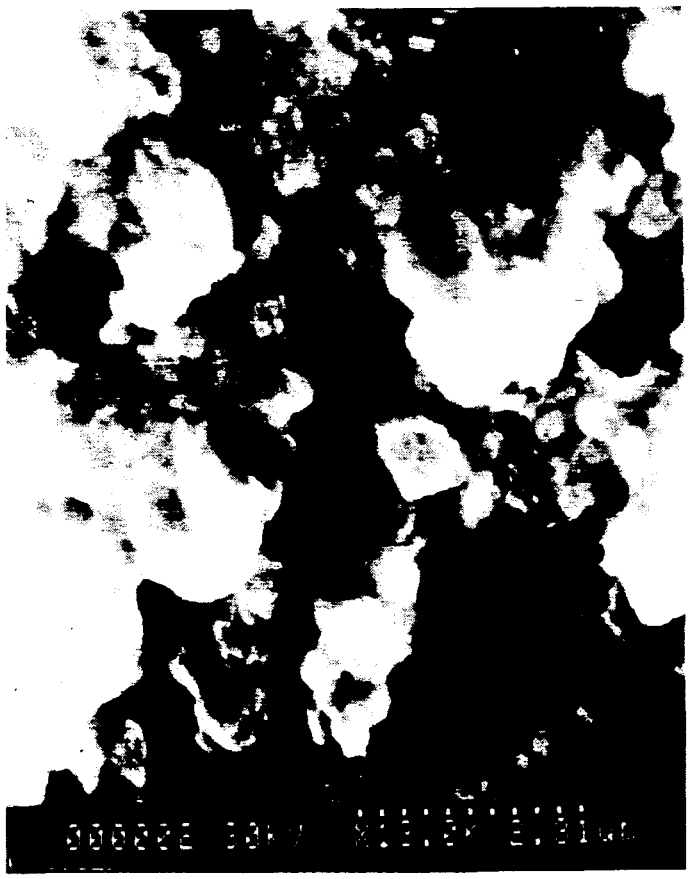
Figure 17:
Figure 18:

FIG. 16 is a normal SEM mode image of the above sample on alumina. FIG. 17 clearly shows a fairly uniform partial coverage of the surface by molybdenum-containing species. FIG. 18 is a split screen image, the bottom BEI image clearly showing areas of coverage by molybdenum-containing species in the top (SEM) image. For comparison, FIG. 19 shows a split-screen SEM/BEI image for alumina itself. The lower BEI image removes the contrast due to elevational effects seen in the top SEM images as expected, if no deposit is on the support surface.

We conclude that the coverage of alumina by deposited molybdenum-containing species leads to areas of highly dispersed thin surface films.

It is one aspect of the present invention that through the use of metal oxide vaporization, the molybdenum trioxide polymer can be broken into smaller units which under suitable reaction conditions can give methoxy oxide species that are soluble in methanol for at least twelve hours thereby facilitating the preparation of molybdenum oxide catalysts using homogeneous solutions of molybdenum oxide species in methanol. The molybdenum oxide catalytic solution can be used in the homogeneous liquid state or it could be used for subsequent dispersion on a solid phase support since once the molybdenum methoxy oxide species are dissolved in the methanol solution these can then readily be dispersed onto the solid phase support. The unsupported MVS precipitate after photoactivation is a finely divided homogeneous material with high catalytic activity (Table 3), a particle size range of 15 nm to 40 nm (FIG. 20B, C and D) and a surface area of $28 m^2/g$. This level of dispersion together with high activity and selectivity (Table 3) is not previously known for molybdenum oxide catalysts. One advantage of the use of MVS is that it eliminates previous difficulties of aggregation and clumping inherent with the wet impregnation methodology. It is predicted that by breaking down the crystalline structure of the molybdenum trioxide the orientation of the molecules can be better controlled by means of the solvent/catalyst interaction. Similarly, new catalytic species having enhanced activity and selectivity may be formed. The use of a solvent and choice of solvent in preparing these new catalytic species is of the present invention a key feature.

Molybdenum trioxide polymer in its crystalline form is normally insoluble in methanol. It cannot be dissolved by simply refluxing. By evaporation and cocondensation in methanol using MVS, molybdenum trioxide can be solubilized in methanol since the vaporization step breaks down the three-dimensional crystalline structure to form smaller particle sizes. When solubilized in this fashion $^{95}Mo$ NMR indicates that there is only one molybdenum species present in solution. Molybdenum trioxide solubilized by this methodology will remain in solution for approximately 12 hours when the initial molybdenum trioxide concentration is approximately 0.5g/50ml methanol. IR and Raman spectroscopy of the precipitated species is illustrated in FIGS. 21 and 22. The IR and Raman spectra in these Figures indicates the precipitated product is not solvated $MoO_3$ but is $Mo_2O_5(OCH_3)_2 \cdot 2CH_3OH$. When the solubilized molybdenum species are precipitated onto H-ZSM-5 and gamma-alumina, greater than 90% of the molybdenum content is precipitated. X-ray powder diffraction (XRD) (FIG. 23a and 23b) also that the precipitated product from the methanol solution is not $MoO_3$.

Characterization of this precipitate that is the precursor to our catalytic species on various solid supports indicates that the product is not $MoO_3$ but may be $Mo_2O_5(OCH_3)_2 \cdot 2CH_3OH$, as formulated by DeKock (cited above) and also McCarron and Sleight [Polyhedron, 5: 129 (1986)]. The product of this preferred embodiment behaves as described by McCarron and Sleight but the XRD data reported by McCarron and Sleight is completely different. DeKock et al never achieved a stable solution. Interestingly we have found that the product has the highest catalytic activity (Table 3) after photoactivation by laboratory fluorescent lighting or a source of ultraviolet light.

Thermogravimetric analysis (TGA) of the product is in agreement with the $Mo_2O_5(OCH_3)_2 \cdot 2CH_3OH$ formulation. A weight loss of 15.5% occurs up to 130° C. (mostly in the 90° C. to 110° C. range), whereas 16.1% loss of $CH_3OH$ is expected. Desorption products were identified as $CH_3OH$ and water. A weight loss of 13.8% occurs in the 130° C. to 290° C. range (mostly in the 220°–260° C. range), compared to the 15.6% loss theoretically expected for the remaining methoxy groups. Desorption products in the 130°–290° range are water, formaldehyde, carbon dioxide, dimethylether and methanol. When the molybdenum methoxy oxide species is supported on solid supports (Example 1), TGA analyses show greatly diminished weight loss above 90° C., compared to the unsupported precursor, and indeed only slight weight loss is observed over a wide range that extends well above temperatures used for catalytic reactions. This expected support stabilization effect on the catalytic species, which was observed for all the supports employed, is illustrated in FIG. 25.

Mass spectra of the catalyst precursor precipitated from methanol have been obtained using the normal Electron Impact and both positive and negative ion Fast Atom Bombardment Mass Spectra (FAB-MS). The dynamic nature of the system and its reactivity with the different matrices tried makes a definitive structural conclusion impossible. The largest ion peak is at 295 m/z and, more importantly, the mass fragmentation pattern gives a best fit, however, for a dinuclear molybdenum species. A suspected molecular ion is seen at 405 m/z.

A crystalline product was obtained during the conversion of cyclohexene to cyclohexene oxide using the molybdenum methoxy oxide species as catalyst, together with cumene hydroperoxide as the oxidant. X-ray single crystal analysis confirms a dimolybdenum structure with two bridging methoxy groups between the cis-dioxo molybdenum moieties. This result supports the other evidence (IR, NMR, FAB-MS) that suggests that the catalytic precursor, resulting after cocondensation and precipitation, has cis-dioxo dimolybdenum sites. FIG. 33, shows the molecular structure of the derived species.

Solid state $^{13}C$ NMR nuclear magnetic resonance spectral data confirm the presence of two inequivalent types of C atoms in the precipitated product as two nearly equal intensity peaks are observed at 53.7 and 67.7 ppm. The former peak may be assigned to the C atoms of the $CH_3OH$ adduct molecules. The higher frequency or deshielded peak at 67.7 ppm corresponds to the methoxy groups bound to the molybdenum. After heating the product to 130° C. the solid state $^{13}C$ NMR spectrum shows a peak at 71.2 ppm, due to only the methoxy groups, in agreement with a formulation of $Mo_2O_5(OCH_3)_2$. McCarron (cited above) reported a chemical shift of 71.6 ppm for this species.

More extensive Raman spectral studies of the product indicate its instability to the laser beam (514.5nm excitation), as peaks near 775 and 850 cm$^{-1}$ (FIG. 22) change in intensity relative to the main 818 cm$^{-1}$ band; exposure to ultraviolet irradiation causes these shoulder peaks to completely disappear with time. These characteristic peaks in the Mo-O-Mo stretching frequency region, which do not occur in the Raman spectrum of solid $MoO_3$, reappear if the sample is subjected to a methanol environment under catalytic conditions. Hence, methanol coordination to the catalyst surface appears to be the same as in the compound $Mo_2O_5(OCH_3)_2 \cdot 2CH_3OH$.

TABLE 2

SUMMARY OF CATALYTIC PERFORMANCE
METHANOL TO FORMALDEHYDE CONVERSION[1,2]

| Catalyst | Temperature | % Conv. to Aqueous Formaldehyde | % Conv. of MeOH |
|---|---|---|---|
| 10% $MoO_3$/alumina (Commercial Prep.) | 220° | 10.24 | 26.6 |
| 15.5% $MoO_3$/3.5% NiO/alumina (promoted commercial preparation) | 220° | 3.9 | 41.8 |
| 14.2% $MoO_3$/H-ZSM-5 (Our preparation) | 220° | 8.48 | 64.6 |
| 4.25% $MoO_3$/alumina (Our preparation) | 220° | 23.5 | 71.5 |

[1] GC traces of these results are depicted in FIG. 24.
[2] All runs were identical in conditions. Temperatures have not been optimized.

Table 2 compares the catalytic performance of catalyst supported catalysts and MVS supported catalysts. In Table 2 the conversion temperature was arbitrarily fixed at 220 deg C. To better assess the real differences in conversion efficiencies and selectivity the temperature for each catalyst was optimized, as seen in Table 3. The MVS catalyst has high efficiency at a much lower temperature than $MoO_3$, indicating a different composition. A similar high activity when placed on $\gamma$-$Al_2O_3$ suggests the structure is maintained. Optimum temperatures were determined experimentally. Optimal temperatures were deemed to be those temperatures giving the highest conversion of methanol to formaldehyde. The data presented in Table 3 reflects these optimized temperatures.

Further experimentation has demonstrated that the MVS-derived catalyst, as prepared in Example 1, has greater activity if photoactivated and not calcined. This is accomplished by aging for several months under laboratory fluorescent lighting or by exposure to an ultraviolet or other suitable light source. The data in Table 3 compares the MVS-derived catalyst with the most commonly used industrial catalyst, $Fe_2(MoO_4)_3$ mixed with $MoO_3$. This catalyst is known in the industry to be highly active both unsupported and supported on alumina. It can be seen from the data presented in Table 3 that the product solutions obtained with the MVS-catalysts show a higher percentage of HCHO and a lower degree of combustion as compared to the commercial catalysts. The unsupported catalyst is highly efficient showing high activity and selectivity at 260 deg C, as compared to 400 deg C, for $MoO_3$ itself and 420 deg C for $Fe_2(MoO_4)_3$ $MoO_3$ unsupported. While the supported $Fe_2(MoO_4)_3$/$MoO_3$ is optimized at 280° C. the lower temperature is not necessarily beneficial since selectivity is reduced to 92%. One difficulty with supported $Fe_2(MoO_4)_3$/$MoO_3$ is that there is a very high degree of combustion ongoing on the surface of the support hereby reducing the amount of desired end product.

Figure 28:
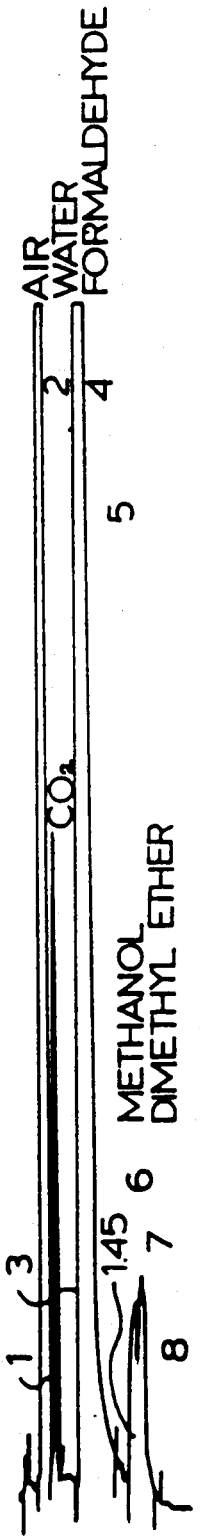
FIG. 28 is a GC tracing using molybdenum trioxide supported on alumina as a catalyst.
Figure 29:
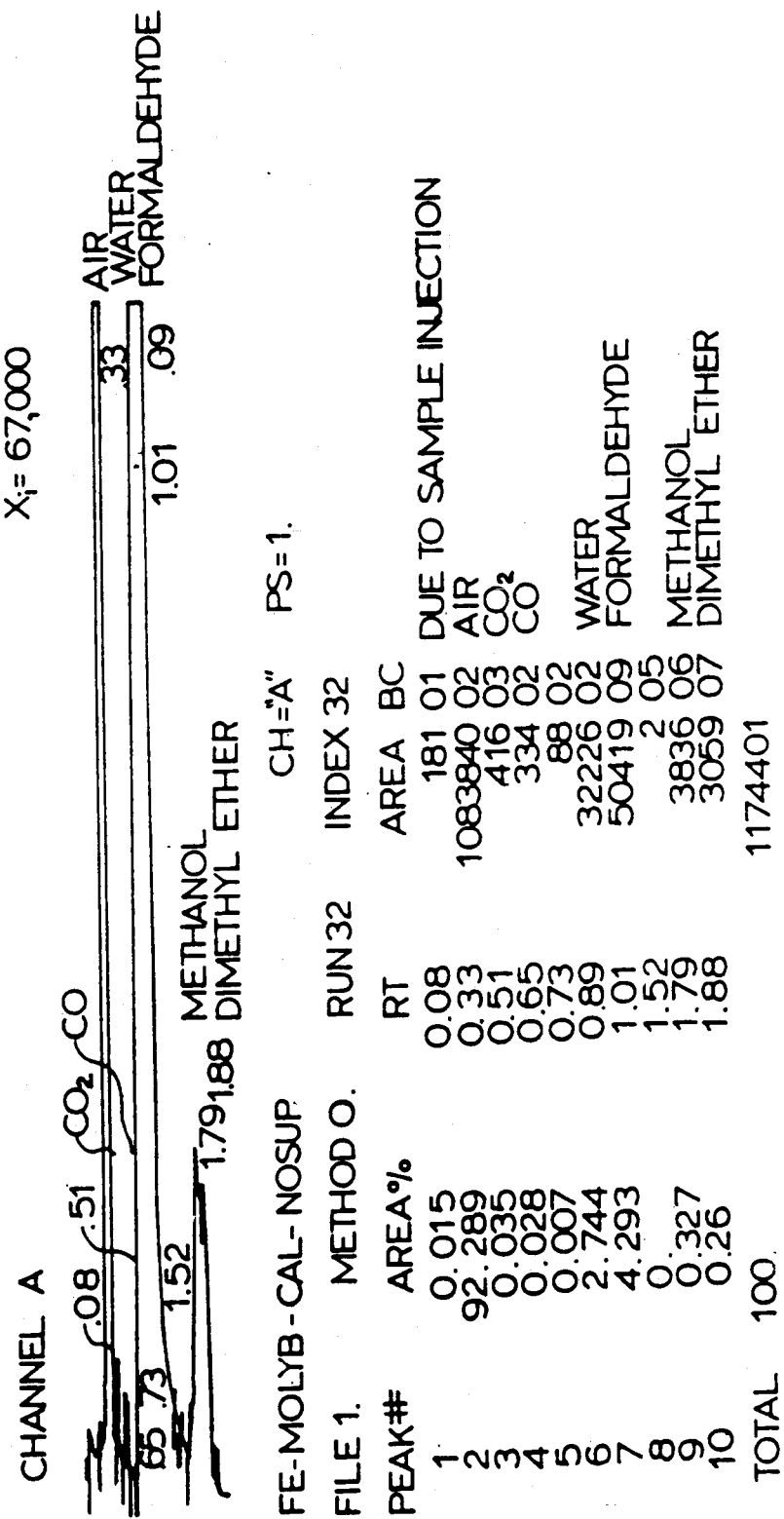
FIG. 29 is the GC tracing for the catalyst $Fe_2(MoO_4)_3/MoO_3$ unsupported for the conversion of methanol to formaldehyde.

The lack of specificity by the supported $Fe_2(MoO_4)_3$/$MoO_3$ catalyst is seen in the corresponding GC tracings (FIGS. 27 to 32). The ratio of formaldehyde:water for the unsupported iron molybdenum catalyst is 60% (FIG. 29). When supported this figure drops to 40% (FIG. 30). For both the unsupported (FIG. 31) and supported (FIG. 32) MVS prepared catalysts the formaldehyde:water ratio is 58% and 54% respectively.

Therefore the novel method of the present invention permits the preparation of a new catalyst which exhibits high activity and high selectivity at advantageously low optimal reaction temperatures. This significant decrease in temperature represents a significant cost savings to industry in applications converting methanol to formaldehyde.

The earlier preliminary results presented in Table 2 are still useful in showing that MVS-derived catalysts are much more efficient than 10% $MoO_3$ on alumina even at a non-optimized temperature (220 deg C).

Figure 31:
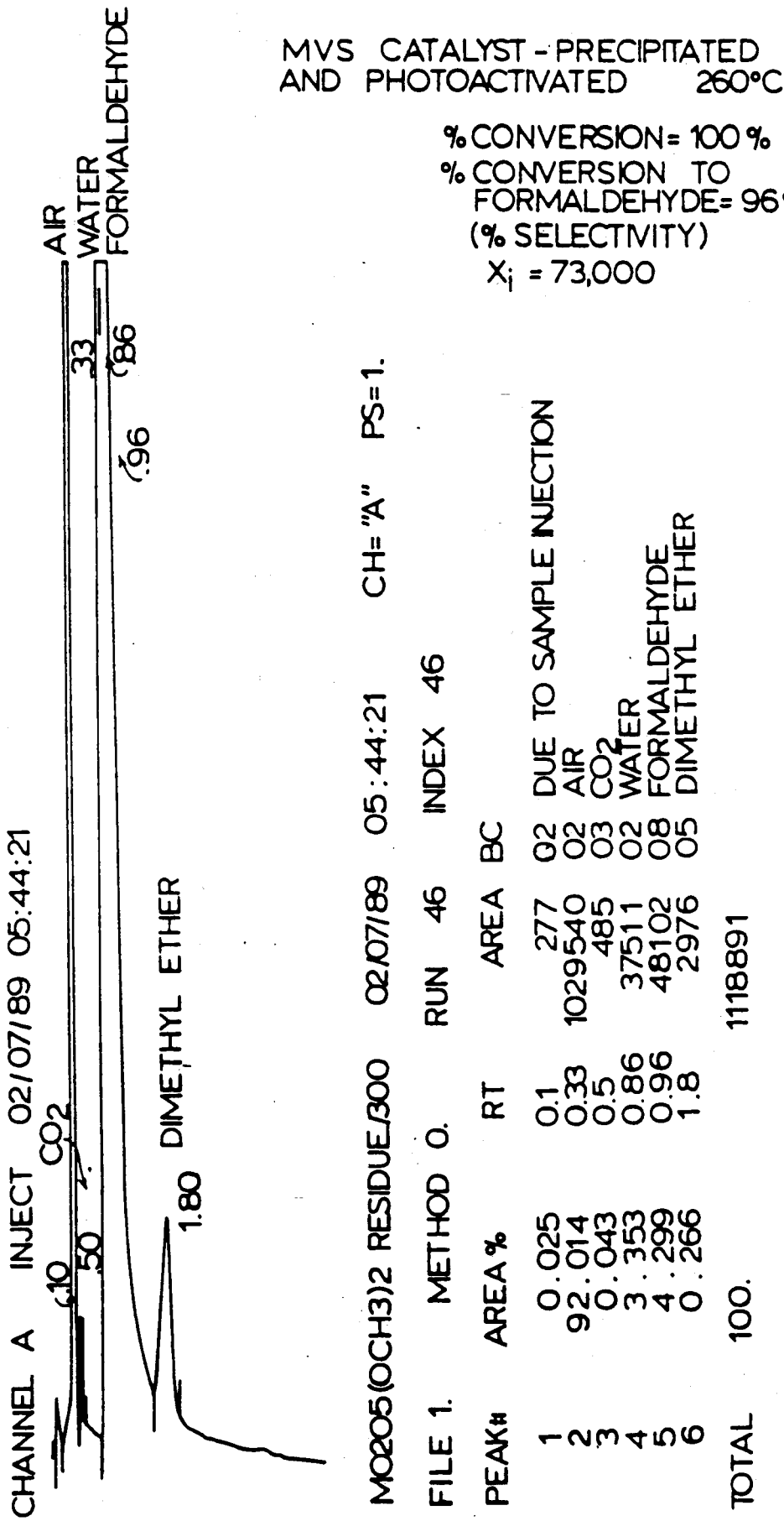
FIG. 31 is the GC tracing of the MVS catalyst precipitated and photoactivated but unsupported used for the conversion of methanol to formaldehyde.
Figure 32:
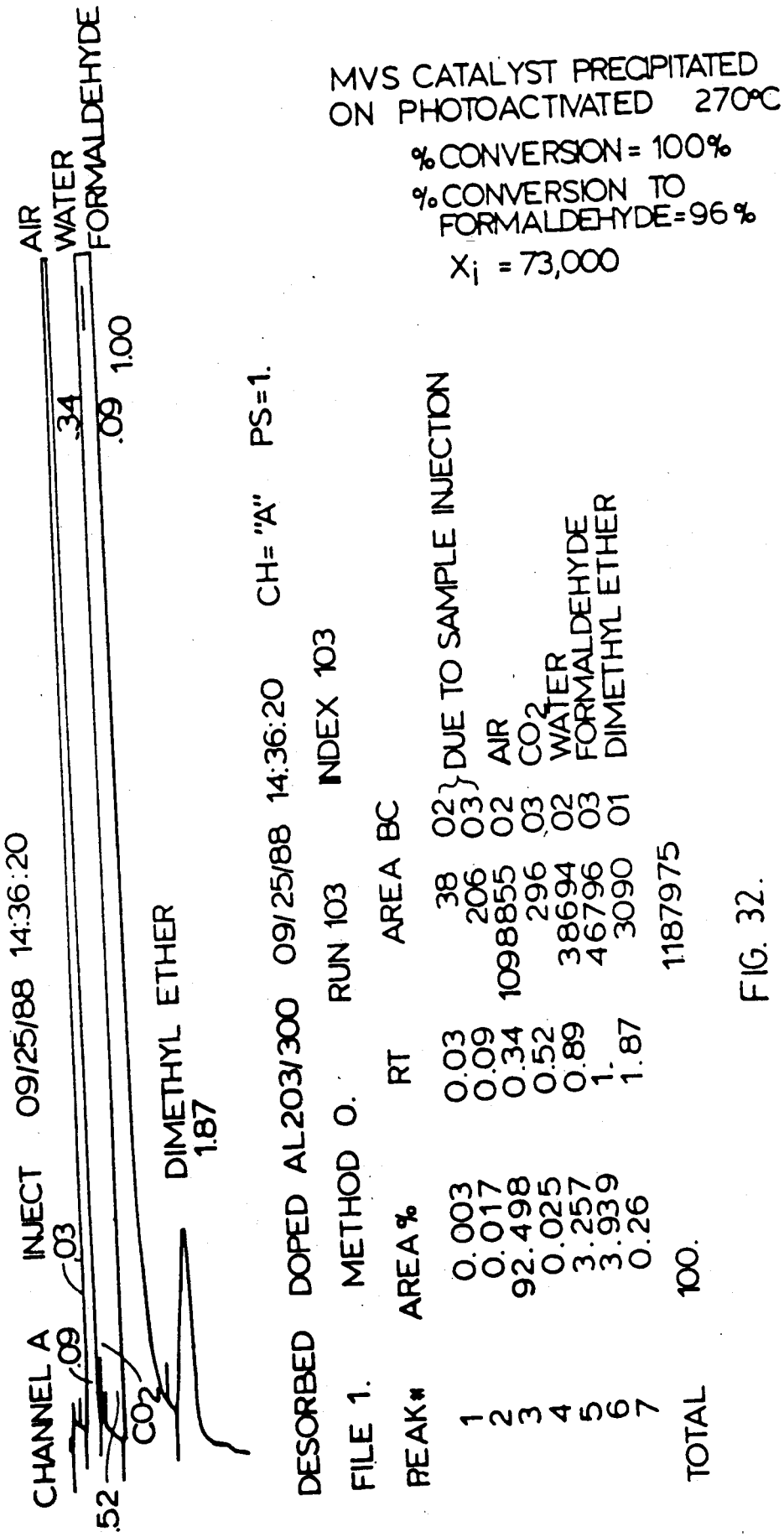
FIG. 32 is the MVS catalyst precipitated on an alumina support and photoactivated for use in the conversion of methanol to formaldehyde.

Gas chromatograph tracings in support of the data presented in Table 3 are illustrated in FIGS. 27 and 32. In the GC tracings the ratio of formaldehyde to water in the product can be determined from the respective peaks of formaldehyde and water. FIG. 27 is the GC tracing for the conversion of methanol to formaldehyde using molybdenum trioxide alone as the catalyst. As seen from the GC tracing this catalytic reaction shows high selectivity (99%) but poor activity (70%). FIG. 28 is a GC tracing using molybdenum trioxide supported on alumina as the catalyst. FIGS. 29 and 30 are GC tracings for typical industrial catalysts used to catalyze the conversion of methanol to formaldehyde. In FIG. 30 the supported iron molybdenum oxide catalyst tracings show large CO and $CO_2$ peaks. These peaks indicate complete oxidation. In both of the MVS prepared catalysts (supported and unsupported) complete oxidation is achieved (FIGS. 31 and 32). However, the selectivity of the MVS catalysts is significantly higher than for the supported iron molybdenum oxide catalyst even though both show 100% conversion of methanol. The lower formaldehyde:water ratio for the common industrial catalyst is seen in the GC tracing of FIG. 30. FIGS. 31 and 32 show large formaldehyde to water ratios.

Further details of the preferred embodiments of the invention will be understood from the following examples which are understood to be non-limiting with respect to the appended claims.

TABLE 3
METHANOL TO FORMALDEHYDE CONVERSION

| Catalyst | Temperature (Optimized) to (deg C.) | % Conversion Aqueous Formaldehyde | % Conversion of methanol | Overall Yield % |
|---|---|---|---|---|
| $MoO_3$[a] | 400 | 99 | 70 | 69% |
| 10% $MoO_3$/alumina[a] | 280 | 92 | 97 | 89% |
| $Fe_2(MoO_4)_3/MoO_3$[b] | 420 | 96[c] | 94[c] | 90% |
| $Fe_2(MoO_4)_3/MoO_3$[b] (on alumina) | 280 | 92[c] | 100[c] | 92% |
| MVS Catalyst (precipitated and photoactivated) | 260 | 96 | 100 | 96% |
| MVS Catalyst (precipitated on alumina and photoactivated) | 270 | 96 | 100 | 96% |

[a]Commercially purchased catalyst preparations
[b]Non-commercial preparations of the most common catalysts used in industry for the conversion of methanol to formaldehyde. These preparations followed published recipes. Briefly, a 5:1 ratio of $MoO_3$ of $Fe_2O_3$ was intimately ground, then calcined for >36 hours at 400–425 deg C. with intermittent cooling and grinding of the mixture in a mortar. The $Fe_2(MoO_4)_3/MoO_3$ mixture (that contains excess $MoO_3$) was mixed with **−$Al_2O_3$ to give 10% by weight of catalyst on the support.
[c]Literature values for selectivity to HCHO are 91–94% and for conversion of MeOH, 95–99% for these catalysts.

EXAMPLE 1

Deposition of $MoO_3$ onto a Solid Support 70 ml of dried methanol, under vacuum in a closed vessel was attached to the rotary metal vapor apparatus. The system was evacuated to a pressure of $5 \times 10^{-7}$ torr and the reaction flask was immersed in a liquid nitrogen bath at a temperature of $\sim -196°$ C. Methanol solvent was allowed to be vaporized into the reaction flask and was condensed and frozen on the immersed sides of the flask. 0.6g of $MoO_3$, was resistively vaporized over a period of $\sim 2$ hours at 22–24 amps of current and an operational pressure of $1 \times 10^{-6}$ torr while $CH_3OH$ was continuously and slowly introduced. The vaporized oxide was trapped in the frozen methanol matrix on the rotating reaction flask walls. After the metal oxide evaporation was complete the system was allowed to warm until the $CH_3OH$-$MoO_3$ matrix had become a faint blue clear solution. This product solution was extracted via a nitrogen Schlenk tube system into an external receiving flask at liquid nitrogen temperature.

The receiving flask was allowed to warm slowly to room temperature under nitrogen. The faint blue solution upon warming slowly changed color and became a clear colorless solution. 1 mL of solution was extracted and diluted to 50 mL for Molybdenum atomic absorption spectroscopy, which determined a Mo concentration of 12.8 ppm.

35 mL of product solution was introduced to 2.25 g of alumina (gamma) with a surface area of 115m²/g. Precipitation was allowed to occur over a 24 hour period at which time a 1mL sample of supernatant was extracted and its concentration was determined to be 5.2 ppm. The coated alumina catalyst was filtered and dried. 0.1 g were digested in base and the stripped Mo was determined to be equivalent to 4.25% $MoO_3$/g of alumina.

The second 35 mL of product solution was allowed to precipitate to form the insoluble $MoO_3CH_3OH$ species. A flake of product was used to obtain the FT-IR of the product which is given in FIG. 21. Another portion of the sample was used for X-ray diffraction. Both the XRD and FT-IR are significantly different from $MoO_3$. The FT-IR is in agreement with Chung et al who have studied $CH_3OH$ chemisorption on $MoO_3$ [Chung, J. S., Miranda, R., and C. O. Bennett, J. Chem. Soc. Faraday Trans. 1, 81: 19 (1985)]. They list the IR bands at 2930, 2830 and 1445 cm$^{-1}$ to be due to methoxy groups bonded on bridging oxygen vacancies between molybdenum atoms.

The prepared catalyst was divided into two portions as described above. The first portion containing the product precipitated on alumina, was desorbed and calcined in a furnace at 550° C. for 12 hours while the second portion comprised of the unsupported product, was kept intact. Both catalysts were run in a flow reactor in a MeOH/air stream while the temperature was ramped from room temperature to over 400° C. then back to room temperature. Although the undesorbed catalyst was found to be active, the desorbed and calcined catalyst was found to be not only significantly better than the undesorbed catalyst, but was significantly better than two commercial catalysts. Results of the catalytic testing are illustrated in Table 2.

EXAMPLE 2

Evaporation and Deposition of Molybdenum Metal and Subsequent Oxidation to Molybdenum Oxide.

70 ml of methylcyclohexane was placed into a closed solvent reservoir vessel and placed under partial vacuum. The reservoir was attached to the rotary metal vapor evaporation apparatus which was equipped with a dual electron gun furnace. 2.06 grams of molybdenum metal rod (8mm in height) was placed onto the furnace evaporation stage and the apparatus was placed under a vacuum of $5 \times 10^{-7}$ torr. The reaction flask was immersed in a liquid nitrogen bath and methylcyclohexane was allowed to be vaporized into the flask and condensed on the cold reaction flask walls. The electron gun was simultaneous engaged and gradually (approx. 20 min) the voltage in the gun was increased to 3.3 kV, at which voltage the molybdenum metal was vaporized. The metal vapors were cocondensed on the reaction flask walls with methylcyclohexane solvent. After evaporation was complete, the reaction flask was allowed to warm until the metal solvate melted. The metal solvate was extracted to an external extraction flask by the means of a nitrogen Schlenk tube system. The solvate was allowed to warm to room temperature over approximately 4 hr.

5.6g of alumina was placed into the metal solvate and stirred for two days after which the metal deposited alumina was filtered and dried. The dried catalyst was treated with t-butyl hydroperoxide to induce oxidation of the molybdenum metal to the oxide form. The final catalyst was filtered, dried and heated to 600 deg.C. to ensure oxidation.

Although preferred embodiments of the invention have been described herein in detail, it will be understood by those skilled in the art that variations may be made thereto without departing from the spirit of the invention or the scope of the appended claims.

We claim:

1. A process for preparing metal oxide catalysts having one or more metal oxide species bound to or entrapped on a solid phase support which comprises:
   vaporizing a metal oxide or two or more metal oxides;
   cocondensing said metal oxide or two or more different metal oxides with a suitable organic liquid solvent which is capable of solvating said metal oxide or metal oxides;
   dissolving said metal oxide or metal oxides in said solvent to form a solvated complex in said liquid solvent;
   contacting said solvated complex with a solid phase support material so as to cause binding or entrapment of said solvated metal oxide specie or metal oxide species to said solid support; and
   removing excess liquid solvent or solution.

2. A process of claim 1 wherein said metal oxide or metal oxides are selected from the group comprising molybdenum oxide, vanadium (V) pentoxide, magnesium oxide, chromium (III) oxide, manganese oxide, iron (II) oxide, cobalt oxide, indium oxide, tin (IV) oxide, lanthanum oxide and, tungsten oxide.

3. A process of claim 1 wherein said a combination of molybdenum oxide and vanadium (V) pentoxide is cocondensed.

4. A process of claim 1 wherein said solid support is selected from the group comprising aluminum oxide, zinc oxide, silica, titania and zirconia.

5. A process of claim 1 wherein said solid support is selected from the group comprising zeolite, pillared clays and sols.

6. A process of claim 5 wherein said zeolite is Faujasite.

7. A process of claim 1 wherein said solid support is selected from the group comprising carbon, glass and metals.

8. A process of claim 1 wherein said metal oxide catalyst is further processed by an activation step following the removal of said excess liquid solvent or solution.

9. A process of claim 1 wherein said metal oxide is molybdenum trioxide.

10. A process of claim 9 wherein said solvent is methanol.

11. A process of claim 10 wherein said solid support is alumina.

12. A process of claim 11 wherein said supported metal oxide specie or metal oxide species is further processed by an activation step following the removal of said excess liquid solvent or solution.

13. A process of claim 12 wherein said activation step is ultraviolet photoactivation.

14. A process for preparing metal oxide catalysts having one or more metal oxide species which comprises:
   vaporizing a metal oxide or two or more metal oxides;
   cocondensing said metal oxide or two or more metal oxides with a suitable organic liquid solvent which is capable of solvating the metal oxide or metal oxides;
   dissolving said metal oxide or metal oxides in said solvent to form a solvated complex in said liquid solvent;
   precipitating said metal oxide specie or metal oxide species solvated in said solvent; and
   removing excess solvent or solution.

15. A process of claim 14 wherein said metal oxide is selected from the group comprising molybdenum oxide, vanadium (V) pentoxide, magnesium oxide, chromium (III) oxide, manganese oxide, iron (II) oxide, cobalt oxide, indium oxide, tin (IV) oxide, lanthanum oxide and tungsten oxide.

16. A process of claim 14 wherein a combination of molybdenum oxide and vanadium (V) pentoxide is cocondensed.

17. A process of claim 14 wherein said solid support is selected from the group comprising aluminum oxide, zinc oxide, silica, titania and zirconia.

18. A process of claim 14 wherein said solid support is selected from the group comprising zeolite, pillared clays and sols.

19. A process of claim 18 wherein said zeolite is Faujasite.

20. A process of claim 14 wherein said solid support is selected from the group comprising carbon, glass and metals.

21. A process of claim 14 wherein said metal oxide catalyst is further processed by an activation step following the removal of said excess liquid solvent or solution.

22. A process of claim 14 wherein said metal oxide is molybdenum trioxide.

23. A process of claim 22 wherein said solvent is methanol.

24. A process of claim 23 wherein said metal oxide specie or metal oxide species are further processed by an activation step following the removal of said excess liquid solvent or solution.

25. A process of claim 24 wherein said activation step is ultraviolet photoactivation.

26. A supported metal oxide catalyst prepared in accordance with a process of claim 1.

27. A supported metal oxide catalyst prepared in accordance with a process of claim 12.

28. A metal oxide catalyst prepared in accordance with a process of claim 14.

29. A metal oxide catalyst prepared in accordance with a process of claim 24.

* * * * *

UNITED STATES PATENT AND TRADEMARK OFFICE
CERTIFICATE OF CORRECTION

PATENT NO. : 5,047,379
DATED : September 10, 1991
INVENTOR(S) : Alyea, et al

It is certified that error appears in the above-identified patent and that said Letters Patent is hereby corrected as shown below:

On the title page: Add
Assignee: University of Guelph

Column 5, line 39, "(OCH3)$_2$" should be -- (OCH$_3$)$_2$ --.

Column 8, line 11, "performed" should be -- prepared --.

Column 8, line 31, after the word "Gas" insert -- chromatograph tracings of the conversion of methanol to --.

Column 9, line 34, "MoO3" should be -- MoO$_3$ --.

Column 9, line 58, "seem" should be -- seen --.

Column 10, line 8, "MoO$_2$O$_5$" should be -- Mo$_2$O$_5$ --.

Column 12, line 16, after the word "also" insert -- indicates --.

Signed and Sealed this

Tenth Day of August, 1993

Attest:

MICHAEL K. KIRK

*Attesting Officer*     Acting Commissioner of Patents and Trademarks